United States Patent
Toda et al.

(10) Patent No.: US 7,660,249 B2
(45) Date of Patent: Feb. 9, 2010

(54) PACKET SHAPING DEVICE, ROUTER, BAND CONTROL DEVICE AND CONTROL METHOD

(75) Inventors: Iwao Toda, Yokohama (JP); Akiko Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 555 days.

(21) Appl. No.: 11/058,993

(22) Filed: Feb. 16, 2005

(65) Prior Publication Data

US 2005/0249115 A1 Nov. 10, 2005

(30) Foreign Application Priority Data

Feb. 17, 2004 (JP) ............................. 2004-039465

(51) Int. Cl.
H04L 12/26 (2006.01)
(52) U.S. Cl. ............... 370/230.1; 370/235; 370/252
(58) Field of Classification Search ......... 370/229–240, 370/253
See application file for complete search history.

(56) References Cited

U.S. PATENT DOCUMENTS 6,985,501 B2 * 1/2006 Suzuki et al. ............... 370/517

FOREIGN PATENT DOCUMENTS

| EP | 0 756 403 | 1/1997 |
|---|---|---|
| EP | 0 878 937 | 11/1998 |
| JP | 58-134557 | 8/1983 |
| JP | 5-244186 | 9/1993 |
| JP | 8-511932 | 12/1996 |
| JP | 2001-160830 | 6/2001 |
| JP | 2001-352316 | 12/2001 |
| JP | 2002-300200 | 10/2002 |
| JP | 2002-314594 | 10/2002 |
| JP | 2002-314595 | 10/2002 |
| WO | WO 95/14337 | 5/1995 |
| WO | WO 95128802 | 10/1995 |

OTHER PUBLICATIONS

Verma et al. "Delay jitter control for real-time communication in a packet switching network" ISBN: 0-87942-649-7,In Proceedings of TriComm' 91, Publication Date: Apr. 18-19, 1991, pp. 35-43.*
Partial European Search Report dated Jun. 9, 2005.
European Search Report dated Sep. 19, 2005.
Hui Zhang et al. Rate-controlled static-priority queueing. Networking: Foundation for the future, vol. 2, conf. 12, Mar. 28, 1993, pp. 227-236, XP010032346.
Notification of Reasons for Refusal dated May 19, 2009, from the corresponding Japanese Application.
Decision of Refusal dated Sep. 24, 2009, from the corresponding Japanese Application.

* cited by examiner

*Primary Examiner*—Kwang B Yao
*Assistant Examiner*—Alex Skripnikov
(74) *Attorney, Agent, or Firm*—Katten Muchin Rosenman LLP

(57) ABSTRACT

A packet shaping device for the purpose of shaping a packet in which burst has grown in a router to an original packet without the burst growth is disclosed. The packet shaping device monitors an arrival time TA of each packet on which a pass time TP is recorded when the packet passes a prescribed pass point and calculates a delay time TD which is a time difference between the pass time TP and the arrival time TA. Then, the packet shaping device obtains a maximum delay time $TD_{max}$ among the delay times, and delays and sends all the arrived packets in such that the delay time of all the arrived packets is equivalent to the maximum delay time.

4 Claims, 22 Drawing Sheets

FIG. 2
(A) FLOW A 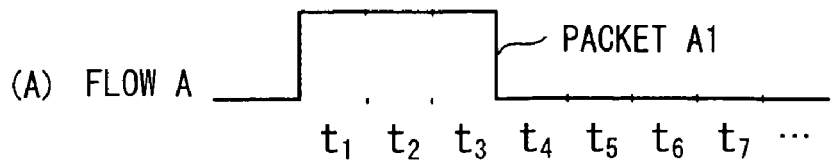
(B) FLOW B 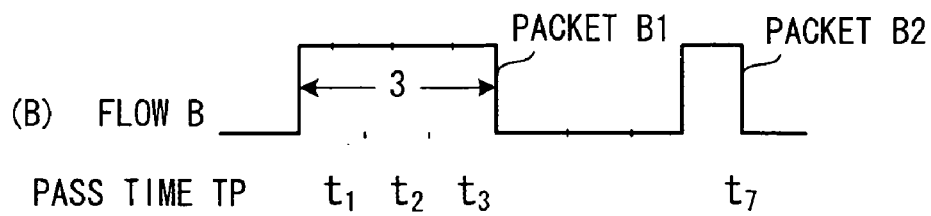
PASS TIME TP     $t_1$  $t_2$  $t_3$           $t_7$
(C) FLOW A' 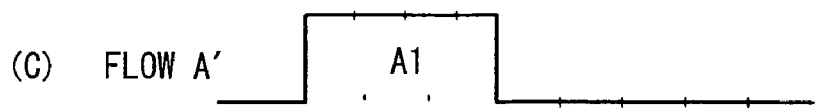
(D) FLOW B' 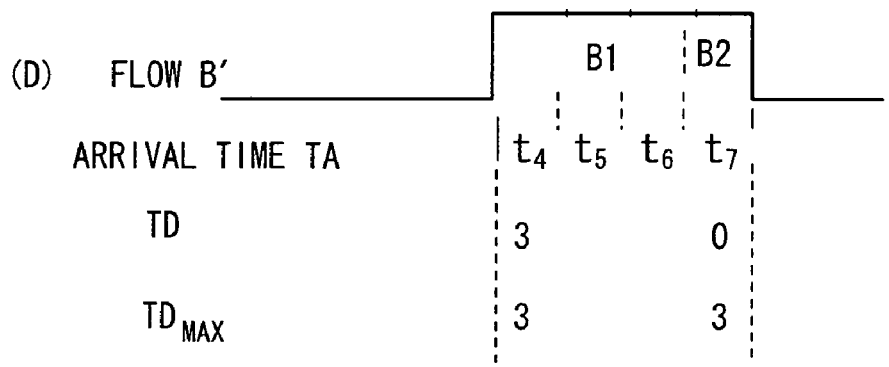
ARRIVAL TIME TA     $t_4$  $t_5$  $t_6$  $t_7$
TD                   3              0
$TD_{MAX}$           3              3
OUTPUT TIME      $t_4$  $t_5$  $t_6$  $t_{10}$
(=PASS TIME+$TD_{MAX}$)
(E) FLOW C 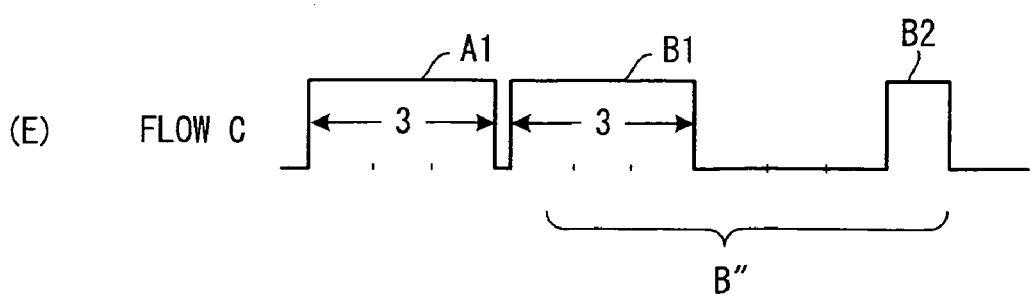

FIG. 5

OUTPUT PART

A. OUTPUT OF PACKETS
- OUTPUT METHOD
    1. OUTPUT TIMER
    2. SCANNING
    3. STUFF PACKET

B. OR OUTPUT OF THE FOLLOWING DATA
    1. OUTPUT TIME

PACKET CONTROL TABLE

FIG. 19
(A)
GATEWAY FLOW DATA
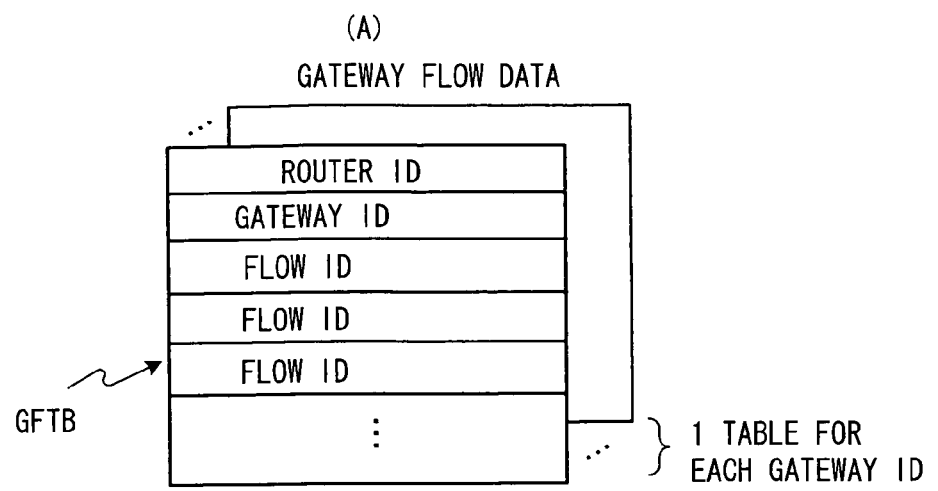
(B)
GATEWAY DELAY DATA
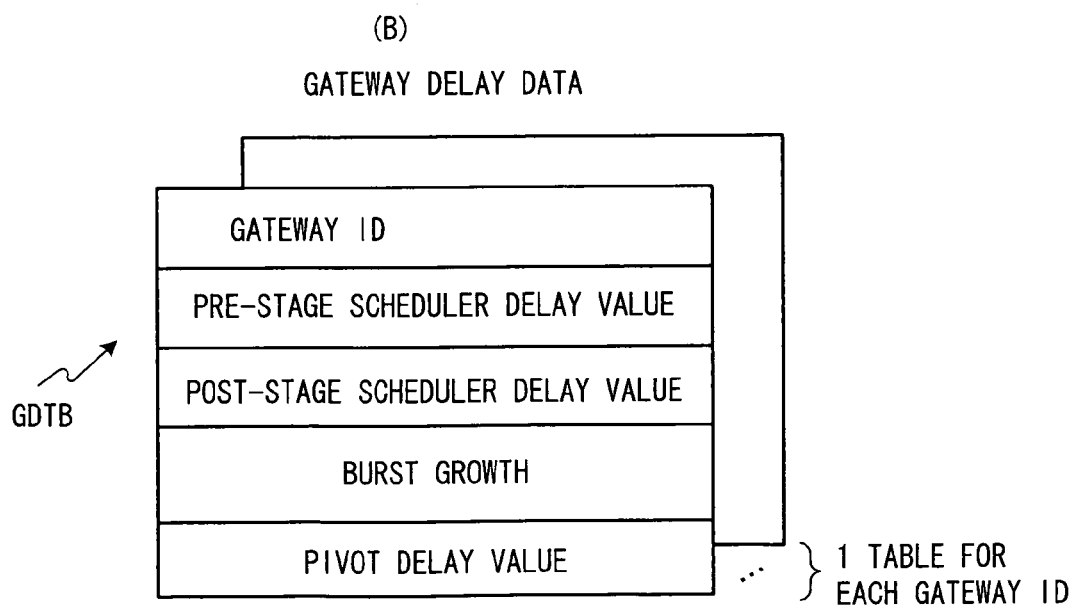

FIG. 24
(A)
RAW NETWORK
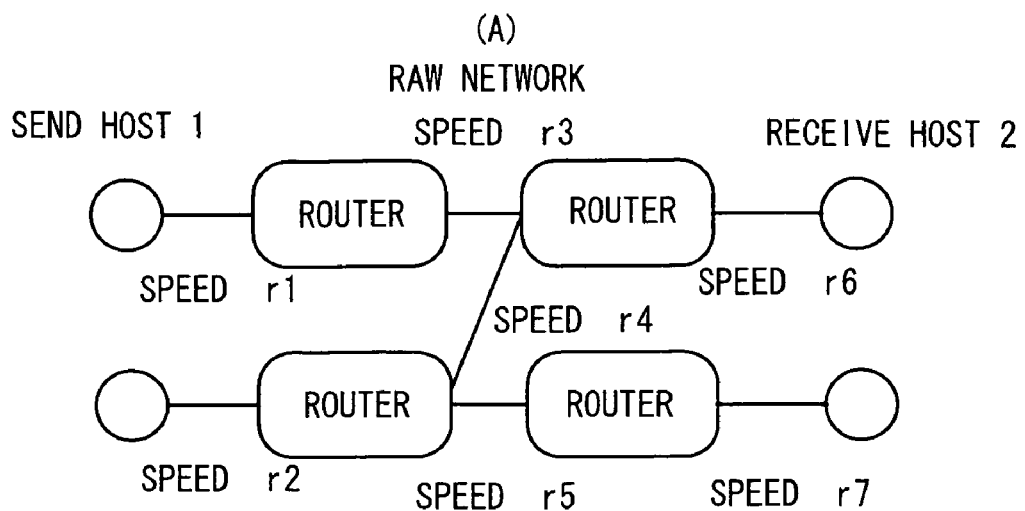
(B)
OVERDESIGN NETWORK
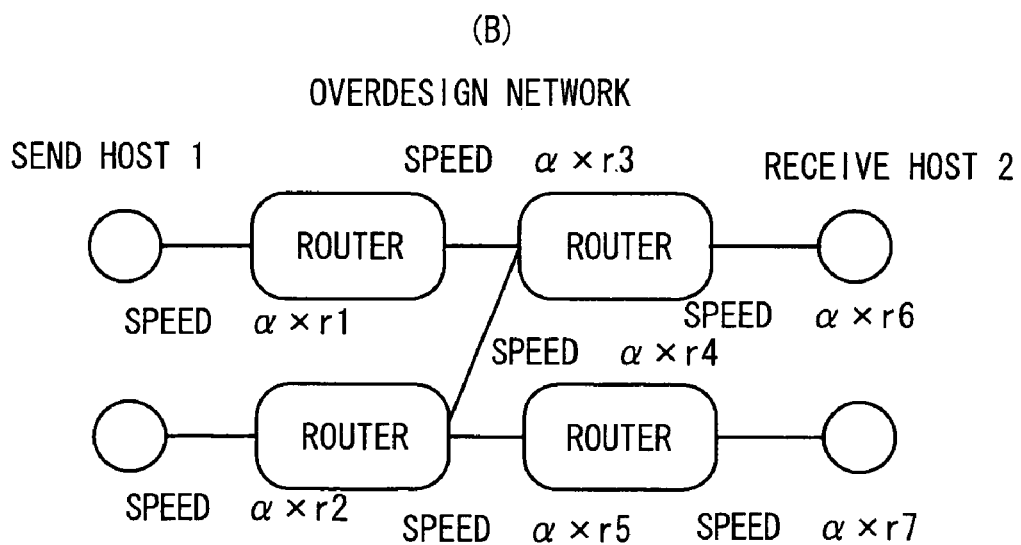

PACKET SHAPING DEVICE, ROUTER, BAND CONTROL DEVICE AND CONTROL METHOD

BACKGROUND OF THE INVENTION

The present invention relates to a packet shaping device, router, band control device and control method, and more particularly to a packet shaping method and device for performing shaping to the original burst length when burst of a flow consisted of packet strings grows in a communication device (network device), a router for suppressing burst growth, and a packet receiving control method and band control device for the configuring of a packet non-loss network.

When packet strings pass through a packet processor such as a router a phenomenon occurs in which burst of an input flow grows. The burst specifies the maximum packet capacity necessary for storing simultaneously in the buffers. FIG. 27 is a block diagram of a packet processor for explaining burst growth, and FIG. 28 is an explanatory diagram of burst growth. Flows A, B are input into the packet processor through two input lines #11, #12 respectively, and are stored successively in buffers A, B. If the packets of flow A must be priority processed ahead of the packets of flow B, a selector SL, if packets are present in buffer A, reads out and inputs a packet A1 thereof into a processing part PRC where it is subsequently output to an output line #2 as a processed flow A'. If there are no packets present in the buffer A the selector SL reads out and inputs packets B1, B2 from the buffer B into the processing part PRC where it is subsequently output to an output line #2 as a flow B'. The configuration of the output flow C thereof is shown in FIG. 28E. Here, as shown in FIGS. 28A and B, the burst length of the flows A and B is 3 bytes, the burst length of the initial packet B1 of flow B is 3 bytes, and the burst length of next packet B2 is 1 byte.

Provided no processing delays occur, the 3 bytes of the packet A1 of flow A are priority processed and, as shown in FIG. 28C, the flow A' is sent without delay to the output line #2. On the other hand, the flow B remains in the buffer B until the 3 bytes of the packet A1 of the flow A have been processed whereupon it is then read out and processed and, at a time t7 following the completion of the processing of the 3 bytes of the initial packet B1, the 1 byte data of the second packet B2 is input. Accordingly, the 1 byte data of the packet B2 is continuously processed without delay at the time t7 and, as a result, as shown in FIG. 28D, the burst length of the flow B' grows from 3 bytes to 4 bytes. Although the length of each of the buffers A, B is 3 bytes, when the flow B' is input into the next stage processor the next stage device buffer must be 4 bytes.

The increased burst length produces undesirable outcomes that are increase in the buffer capacity of the next stage processor, increase delay time, and increase packet loss rate. The operation for removing burst growth is referred to as packet shaping and, as a hitherto used technique for achieving this, a well-known leaky bucket shaping device has been used. However, the configuration for achieving this necessitates knowledge of the property about the flow such as maximum burst length of the flow and the like and, apart from this, a leaky bucket shaping device is unsuitable for use in a large-scale network because a separate device is required for each single flow.

It should be noted that a technique for increasing operation efficiency in a data communication network by lowering the burst property of the traffic and suppressing the quantity of network resources that should be secured has been disclosed in the background art (see Japanese laid open Patent Application No. JP2002-314594A). However, this technique of the background art is a technique for statistically suppressing burst length and is not a technique for the deterministic or logical suppression of the burst growth generated in a network.

Based on the above, a demand exists for a device able to more efficiently shape (suppress burst growth) the large number of flows handled by a router without knowledge about the properties of each of the flows.

Thereupon, a packet network that transmits packets has been configured by a send host and a receive host, connection means between the send host and receive host, routers, and transmission links. By way of transmission links and routers, the send host sends packets in which a destination address is written on the packet header thereof to the receive host of the destination address. The router reads the destination address for each received packet and determines the next stage router, whereupon the packet is transferred to the next stage router. This operation is repeated as the packet is led from the send host to the receive host. An increase in the delay time of the packet at this time, that is to say, an increase in the time required to send the packet from the send host to the receive host, and packet loss have a bad influence on the quality of the sound and image carried by the packet.

The cause of increased delay time and packet loss is the increased burst length caused by burst growth in the network and, as a result, an increase in buffer capacity, an increase in delay time and an increase in buffer packet loss rate occur in the downstream flow routers in which the growth accumulates.

Based on the above, a demand exists for a router that suppresses burst growth.

In addition, an existing and significant technical subject is the economical guarantee of communication quality QoS (Quality of Service: packet loss rate, delay and so on) of each flow in a large-scale network.

A technique known as Intserv has been hitherto proposed and, in this technique, a required quality guarantee is realized by identifying individual flow for each of the routers of the network. But in Intserv the information of each of the flows must be recorded in each router and, accordingly, with networks of increased size in which there is an increased number of flows, the system is very complex, very expensive, and unsuitable for actual application.

In addition, a technique referred to as Diffserv has also been proposed. This Diffserv involves the classification of the flows into a small number of quality classes as well as implementation of a quality guarantee operation on flows having an identical quality class with the designated class in batches by the routers.

Although, by virtue of the fact that the routers need only record the operation of quality classes, the actualization thereof is simple, because the operation is implemented in batches, quality assurance of individual flows is impossible and the demands of a user cannot be met.

Based on the above, a demand exists for a packet non-loss network in which the QoS of each flow is guaranteed without need for the recording of the data of each flow.

Although, as described above, a demand exists for a packet shaping device and method able to perform the efficient shaping (suppression of burst growth) of a large number of flows handled by routers without knowledge about the properties of each flow, no such packet shaping device and shaping method are currently available.

In addition, although a demand exists for the economical guarantee of the QoS of each flow in a large-scale network, no such effective technique is currently available. One of the reasons for the generation of the QoS problem is the packet loss produced by buffer overflow that occurs in a router when a flow passes through a router. When the buffer capacity of a router is smaller than the burst length of the flow that is input, that is to say, smaller than the length of the longest packet string that must be simultaneously stored in the buffer of the router, packet discarding and packet loss occur. In order to prevent packet discarding the burst length for each flow must be predicted and the router buffer arrangement must be performed in advance.

However, growth of burst occurs each time a flow passes through a router (burst length at time of output is larger than at time of input). In the relay of a single flow the downstream routers require a successively larger buffer. By virtue of the fact that prediction of growth is difficult, existing IP networks are designed on the premise that packet discarding occurs in the routers. Thereupon, if packet discarding can be prevented in all routers within a network, the desired QoS assurance for each flow-becomes possible in this network.

SUMMARY OF THE INVENTION

Based on the above, a first object of the present invention is to provide a packet shaping device and method in which plural flows handled by network devices such as routers can be efficiently shaped (burst growth suppressed) without knowledge about the properties of each flow.

A second object of the present invention is to provide a router that can suppress burst growth and can prevent packet discarding without need for the recording of the information of each flow and, moreover, that can be used to ensure the QoS of each flow in a large-scale network.

A third object of the present invention is to provide a packet non-loss network that ensures the QoS of each flow without need for the recording of the information of each flow in each router, and a packet receiving control method and band control device for the configuring of this network.

The first object thereof is achieved using a packet shaping method and packet-shaping device that performs shaping to the original burst length when the burst of a flow consisted of packet strings grows in a communication device such as router. In this packet shaping method or packet shaping device, an arrival time is monitored for each packet on which pass time has been recorded, the delay time from the location of recording of the said pass time to the location of monitoring of the arrival time is calculated for each arrived packet, a maximum delay time among the delay times of the packets that have arrived to that point is obtained, the send time of the arrived packets is determined on the basis of the maximum delay time, and the packets are sent at the send time. Alternatively, instead of the delaying send of the packets, data specifying the send time for sending the arrived packets is output. When the packets are sent, the packet batch-shaping device enters the said send time on the pass time field of the packets. Furthermore, the said communication device comprises one or more groups of input line and output line, and the said packet shaping is implemented on each output line.

The said second object is achieved using a router that selects a prescribed output line on the basis of the destination address of each packet that constitutes an input flow, classifies packets based on the header contents thereof into QoS packets for which communication quality guarantee (QoS) is required and non QoS packets for which QoS is not required, and sends these packets to an output line in an order that guarantees the transmission quality of the said QoS packets. This router further comprises routing means for routing the packets to the prescribed output line side, means for separating the packets into QoS packets and non QoS packets, a packet shaping device, provided in each output line, for shaping the QoS packet strings in which burst growth has occurred to packet strings in which the burst growth has been removed, and packet send means for sending the said non QoS packets at a timing at which said QoS packets are not sent.

The packet shaping device of the router monitors the arrival time of the QoS packets, calculates the delay time from the location of recording of the said pass time to the location of monitoring of the arrival time of the arrived packets, obtains a maximum delay time among delay times of the packets that have arrived to that point, determines send time of the arrived packets on the basis of the arrival time and the maximum delay time, and enters the output time on the pass time field of the packets.

In addition, the router comprises packet buffers for storing said packets that have arrived and means for producing for each packet a control data table that contains the arrival times of the packet, and said packet shaping device, using the said control data table of each QoS packet, determines the packet output time in response to the said delay time and records this in the control data table, and the said packet send means, based on the packet output times recorded in the said control data table, sends the QoS packets and sends the said non QoS packets at a timing at which the said QoS packets are not sent.

The said third object is achieved using a communication request acceptance control method or band control device and an input monitor in a packet non-loss network that calculates and records buffer usable capacities of all the routers in a network and usable capacities of all links connected between the routers, determines a path to a designation address when a communication request generates, and accepts this communication request when the buffer usable capacities of all related routers along said path are larger than a requested buffer use amount specified by a declared flow property in said communication request and when the usable capacities of all links on the route are larger than a requested link use amount specified by a declared flow property in said communication request. And the third object is achieved by an input monitor that ensures that the properties of the flows flowing into the network are less than the declared properties.

In the communication request acceptance control method of the band control device, the said link usable capacity is calculated by the deduction of the requested link use amount of all flows flowing into the links from the maximum usable capacity of said links, and the said buffer usable capacity of the router is calculated by the deduction of the total requested buffer use amount of the flows flowing into the router from the maximum buffer usable capacity of said router. The said requested link use amount can be calculated from the speed of the flows, and the said requested buffer use amount can be calculated from the burst length and speed of the flows upon input into said router and the maximum delay value of scheduler in a gateway.

When a normal router (not a burst growth suppressing-type router) is used the requested buffer use amount is equivalent to the burst length of the flow. However, the burst length of the flow increases when it passes through a router. This is known as burst growth. The burst growth of each flow generated in said router is calculated by the multiplication of the maximum packet delay value of the relevant flow in said router and the flow output speed. A description of maximum packet delay value is given in, for example, the publication (Toda et. al.: Detailed Explanation of QoS Techniques, Ohm Co., 2001 pp. 214-231). By virtue of the fact that burst growth accumulates each time a flow passes through a router, the desired buffer amount of a single flow increases the further downstream it travels along a communication path.

By virtue of the fact that, if the router used is a burst growth suppressing router, the burst growth produced in a router can be removed using a packet batch-shaping device in the router, burst growth does not accumulate. Notably, if the router used is a burst growth suppressing router, the requested buffer use amount is calculated by adding the buffer amount in the burst growth suppressing part to the burst length of the input flow.

When the input monitor detects the completion of a flow, the band control device adds the link capacity and buffer capacity of the link and buffers pertaining to the completed flow to the buffer usable capacity of the link and router respectively.

Based on the packet shaping method and packet shaping device of the present invention, a large number of flows handled by network devices such as routers can be efficiently shaped (burst growth can be suppressed) without knowledge about the properties of each flow.

Based on the router of the present invention, the burst growth produced in a router can be suppressed and, as a result, the packet discarding can be prevented without the need for the recording of the information of each flow in the routers, and the QoS of each flow can be ensured in a large-scale network.

Based on the communication request control method or band control device of the present invention, a packet non-loss network in which the QoS of each flow is ensured without need for the recording of information of each flow in the routers can be configured.

Other features and advantages of the present invention will be apparent from the following description taken in conjunction with the accompanying drawings.

BRIEF DESCRIPTION OF THE DRAWINGS

FIG. 2 is an explanatory diagram of the principles of suppressing burst growth;

FIG. 5 is an explanatory diagram of the output mode of a packet batch-shaping device;

FIG. 19 is a path data table;

FIG. 24 is an explanatory diagram of an over-designed network;

DESCRIPTION OF THE PREFERRED EMBODIMENTS (A) Outline of the Invention

Figure 1:
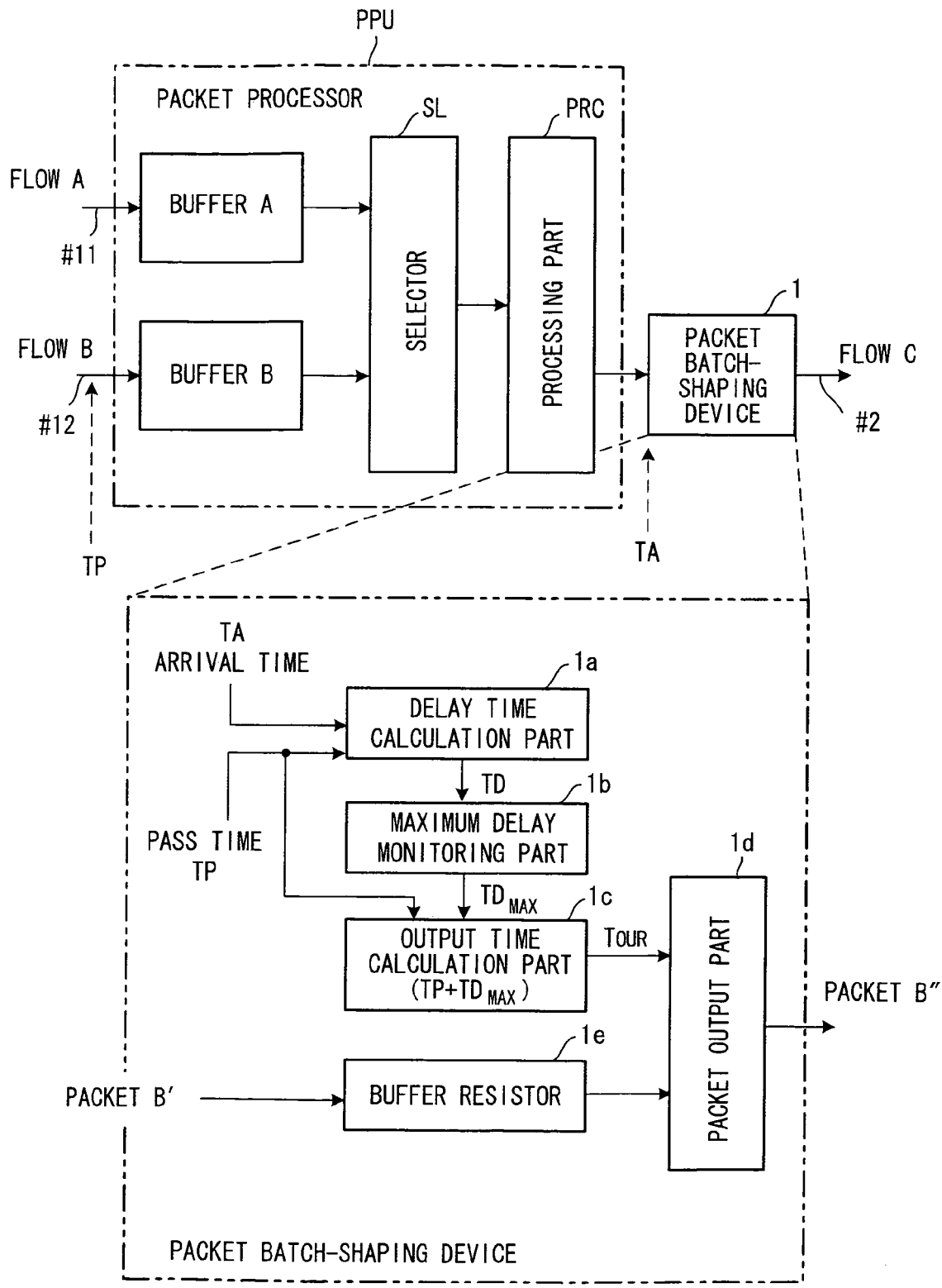
FIG. 1 is a schematic explanatory diagram of the packet batch-shaping device for suppressing burst growth of the present invention.

FIG. 1 is a schematic explanatory diagram of the packet batch-shaping device for suppressing burst growth of the present invention, and FIG. 2 is an explanatory diagram of the principles of suppressing burst growth.

Figure 27:
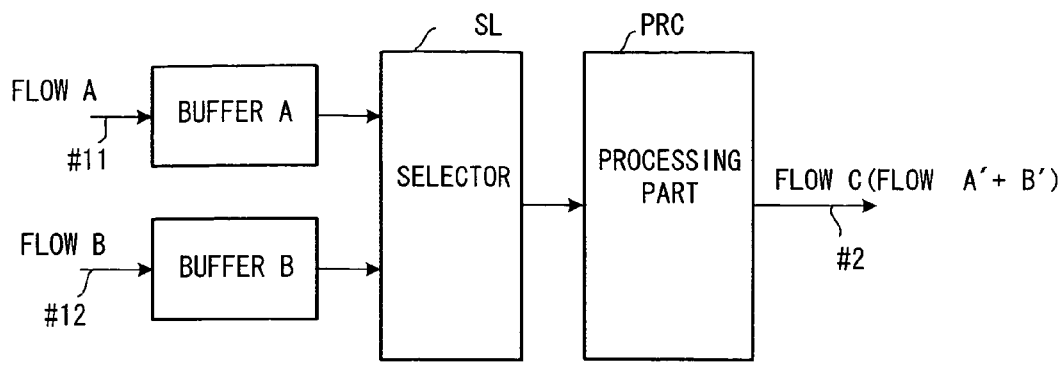
FIG. 27 is a block diagram of a conventional packet process device for explaining burst growth.
Figure 28:
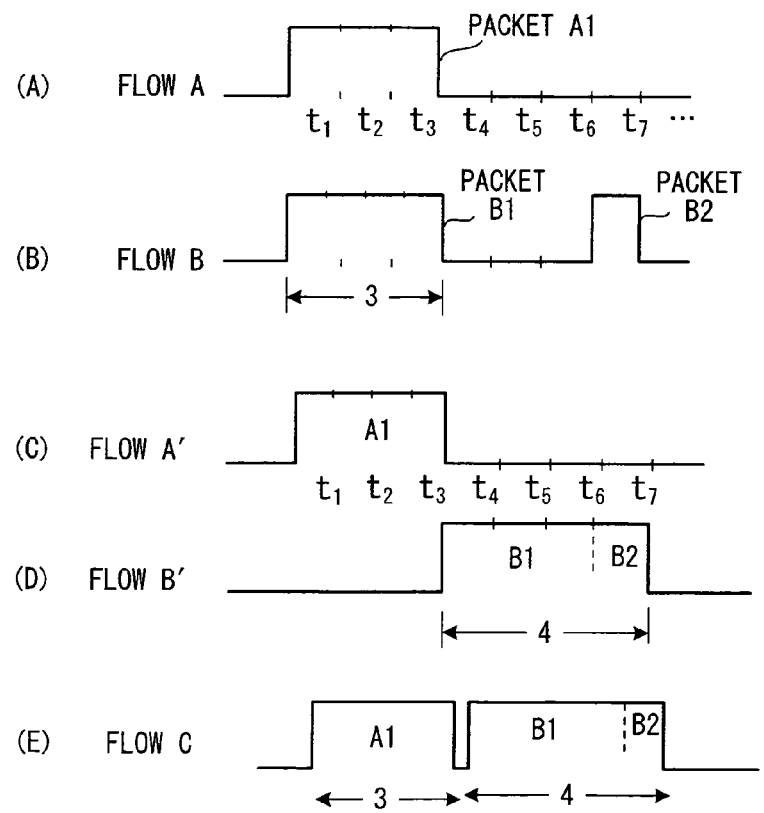
FIG. 28 is an explanatory diagram of burst growth.

A packet processing unit PPU comprises the configuration shown in FIG. 27. Although the burst length of the input flows A, B shown in FIG. 2 or FIG. 28 is 3 and the burst length of the output flow A' is 3, the burst length of the output flow B' has grown to 4. It should be noted that, although not shown in the diagram, the packet processing unit PPU records on the packets A1, B1, B2 the pass time TP at which the packets pass through a prescribed point.

A packet batch-shaping device 2 shapes the flow B' and outputs a flow B" in which the flow B' has been shaped to the flow B" of the original burst length. In the packet batch-shaping device 2, a delay time calculation part 1a monitors the arrival of packets on which the pass time TP has been recorded and calculates the delay time TD (=TA−TP) of the arrived packets from the location of recording of pass time TP to the location of monitoring of the arrival time TA, a maximum delay monitoring part 1b determines a maximum delay time $TD_{MAX}$ among the delay times of arrived packets, and an output time calculation part 1c calculates a packet output time $T_{OUT}$ by adding the maximum delay time $TD_{MAX}$ to the pass time TP of each arrived packet and inputs this into a packet output part 1d. Because the arrived packets are stored in a buffer resistor 1e, the packet output part 1d outputs these packets at designated output time $T_{OUT}$.

A description of the operation of the above is given below with reference to FIG. 2. The pass time TP of a packet B1 of an initial flow B is time t1 and the arrival time TA is time t4. Accordingly, there is a delay time TD (=3) at the point that the initial packet B1 arrives, said delay time becomes the maximum delay time TD, the output time $T_{OUT}$ of the initial packet B1 is equivalent to t1+3=t4, and the packet B1 is immediately output.

On the other hand, because the pass time TP of the next packet B2 is time t7 and the arrival time TA thereof is time t7, the delay time TD at the point that said next packet B2 arrives is 0 and the maximum delay time $TD_{MAX}$ stays at 3. Accordingly, the output time $T_{OUT}$ of the next packet B2 is equivalent to t7+3=t10 and the output is delayed by 3 time units. As a result, as illustrated fully in FIG. 2E, the flow B" is shaped to the original burst length 3. Although the description given here pertains to two flows, the principles described above are also applied to a case where there are a large number of flows, thereby the simultaneous shaping of the burst of all the flows is possible.

(B) Suppression of Burst Growth (Shaping)

(a) Packet Batch-shaping Device

Figure 3:
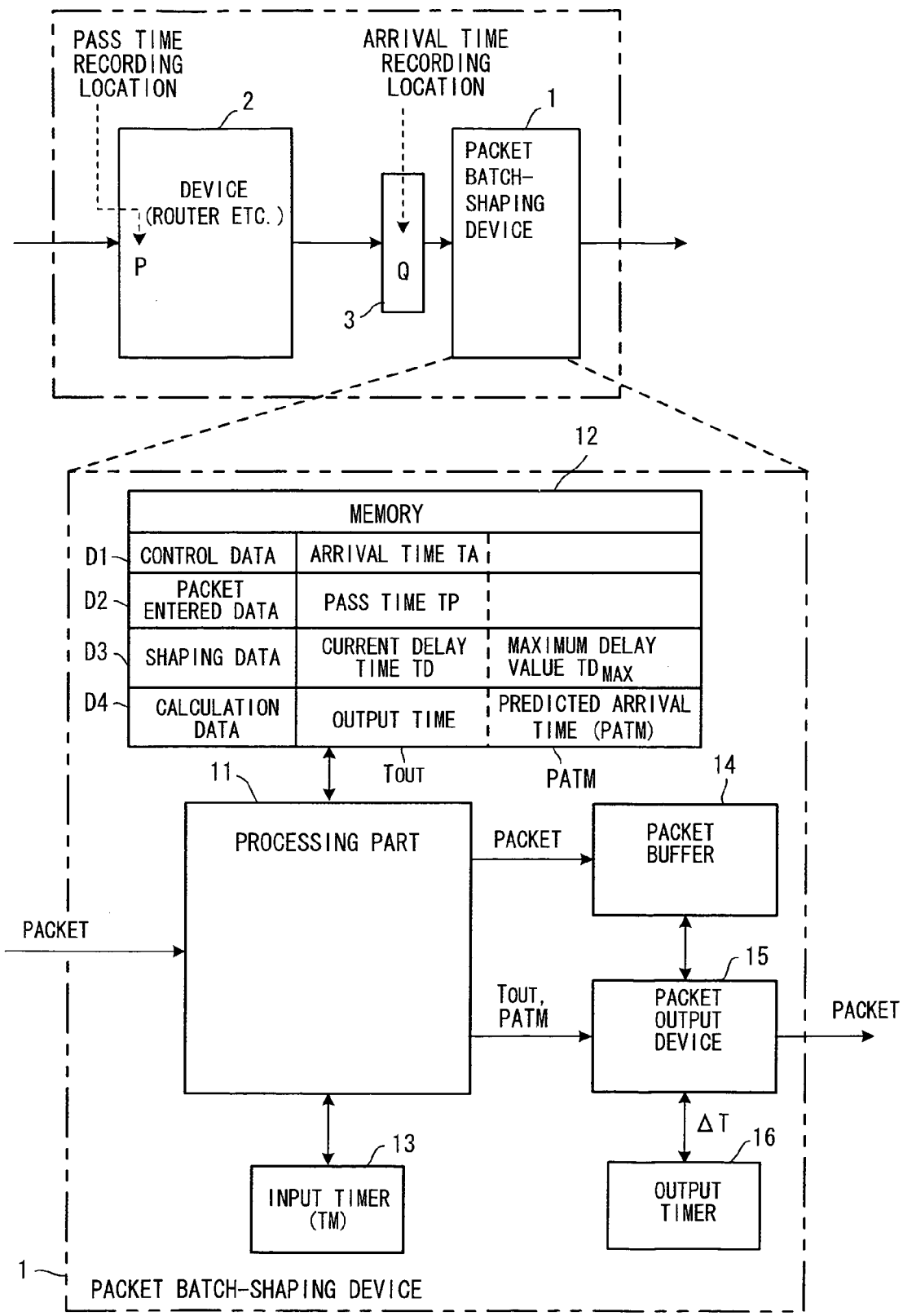
FIG. 3 is a block diagram of the packet batch-shaping device for suppressing burst length growth of the present invention.

FIG. 3 is a block diagram of the packet batch-shaping device for suppressing burst growth of the present invention. A packet batch-shaping device 1 performs the shaping to the original burst length by suppressing the burst growth generated in a network device 2 such as a router. The network device 2 comprises a time function for entering on a packet the pass time TP at which the packet passes through an inner point P. In addition, a packet arrival monitoring part 3 for entering on an arrived packet an arrival time TA of the arrived packet is provided in prior stage to the packet batch-shaping device 1. The packet arrival monitoring part 3 does not necessarily exist as an independent device and monitoring of the arrival time is possible in the packet batch-shaping device 1.

The packet batch-shaping device 1 comprises a processing part 11 for performing the later-described packet shaping processing and storing the arrived packets in a packet buffer, a memory 12 the storing various data, an input timer 13 for monitoring flow completion in which a packet arrival predicted time is set, a packet buffer 14 for storing the arrived packets, a packet output device 15 for sending the packets stored in the packet buffer 14 at a packet output time $T_{OUT}$ designated by the processing part 11, and a timer 16 in which a packet output time is set.

Control data D1, packet entered data D2, shaping data D3 and calculation data D4 are recorded in the memory 12. The control data D1 comprises data specifying the arrival time TA, the packet entered data D2 comprises data specifying the pass time TP, the shaping data D3 comprises data specifying the current delay time TD and maximum delay time $TD_{MAX}$, and the calculation data D4 comprises data specifying the packet output time $T_{OUT}$ and packet predicted arrival time PATM.

(b) Packet Shaping Process Flow

Figure 4:
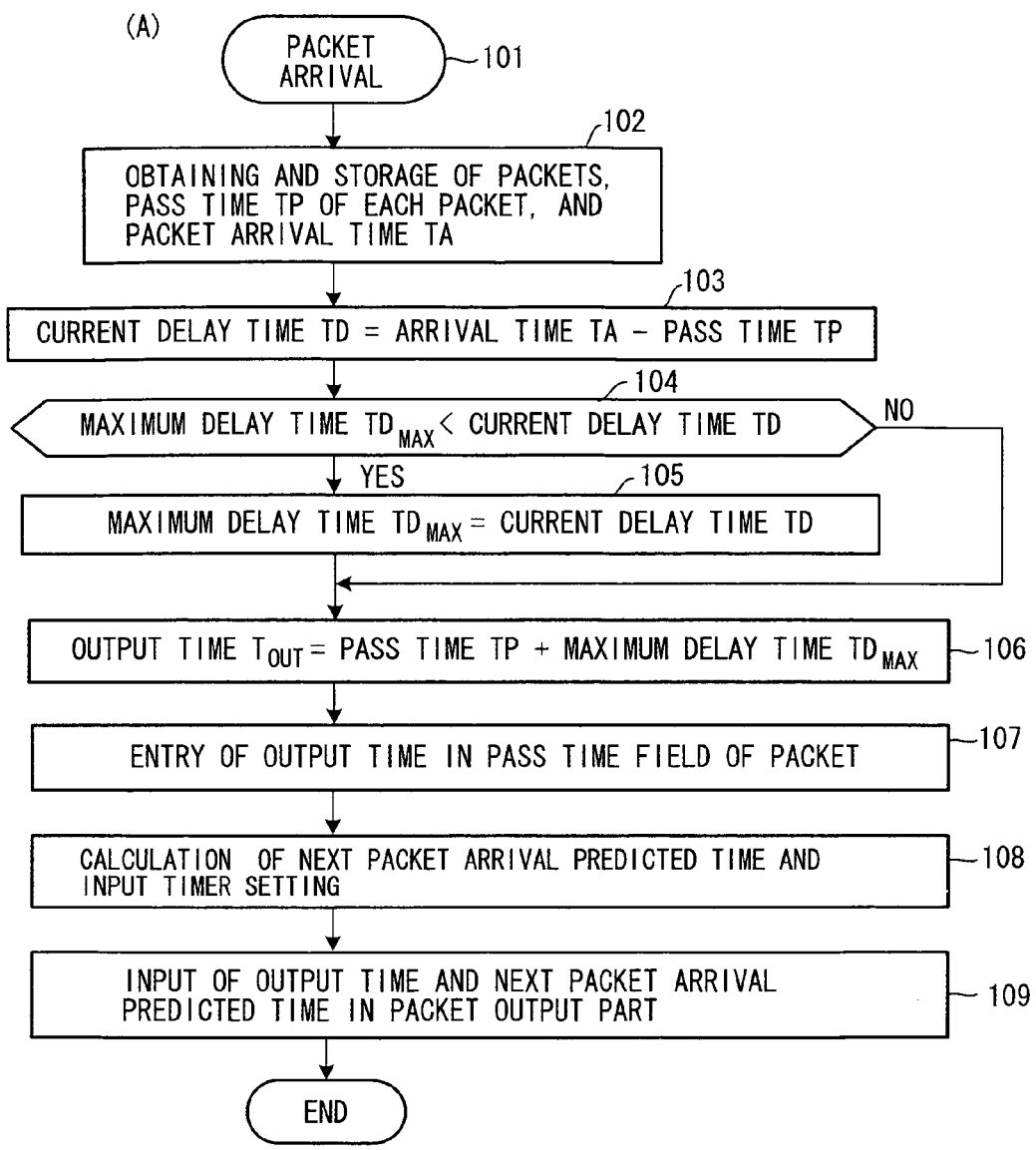
FIG. 4 is a process flow diagram of the packet shaping of the present invention.

FIG. 4 shows a packet shaping process flow diagram of the present invention. Incidentally, the initial value of the maximum delay value (maximum delay time) $TD_{MAX}$ is 0.

The processing part 11 monitors whether a packet has arrived and, if it has arrived (Step 101), it stores the packet in the packet buffer 14 and stores the pass time TP and arrival time TA in the memory 12 (Step 102). Next, based on the following equation:

$$TD=TA-TP,$$

the processing part 11 calculates the existing delay value (delay time) TD (Step 103) and compares this and the maximum delay value $TD_{MAX}$ (Step 104) and, if $TD>TD_{MAX}$, takes the existing delay value TD as the maximum delay value $TD_{MAX}$ (Step 105).

Upon confirmation of the maximum delay value, based on the following equation:

$$T_{OUT}=TP+TD_{MAX},$$

the processing part 11 calculates the output time $T_{OUT}$ of the interest arrival packet (Step 106). Next, the output time $T_{OUT}$ is entered on the pass time field of the packet (Step 107).

Furthermore, based on the following equation:

$$PATM=(TP+TD_{MAX}+(\text{output time of packet of maximum packet length in the packet string}))\times \text{safety coefficient},$$

the processing part 11 calculates the predicted arrival time PATM of the packet and sets this in the input timer 13 (Step 108). The maximum packet length is contained in the declared flow properties.

Thereafter, the processing part 11 inputs the packet output time $T_{OUT}$ and the predicted arrival time PATM of the next packet into the packet output device 15 (Step 109) whereupon, based on the above, it completes the packet shaping process, returns to the start, and waits for the next packet. It should be noted that, in stead of the output time $T_{OUT}$, the processing part 11 can output the finite difference $\Delta T$ between the arrival time TA and output time $T_{OUT}$ to the packet output device 15.

The packet output device 15 sets, for example, the finite difference $\Delta T$ in an output timer 16 and, when the output timer 16 generates an interruption in accordance with elapse of $\Delta T$, sends a corresponding packet to the output link at the output time $T_{OUT}$.

Each time a packet arrives, the predicted arrival time PATM of the next packet is set to the input timer 13 (TM), in a Step 108. If the packet predicted arrival time elapses without the packet having arrived, the input timer 13 inputs a timer interruption to the processor 11 (Step 110). The processor 11, based on the timer interruption, deems the input flow to be completed (communication completion), establishes the maximum delay value (maximum delay time) $TD_{MAX}$ as 0, and clears the timer 13 (Step 111).

(c) Output Mode

FIG. 5 is an explanatory diagram of the output modes of the packet batch-shaping device. These output modes, as is described in the embodiment above, include: (A) a method for outputting the packets directly; and (B) a method for outputting packet output time $T_{out}$ and not the packets. The method of (B) can have application in cases where an external device outputs a packet based upon the packet output time.

(c-1) Mode for the Direct Output of a Packet

Specific methods for the output of a packet include: (1) a timer interruption system as described in this embodiment; (2) a scanning system; and (3) a stuff packet insertion system.

As is described, the timer interruption system constitutes a system in which the relevant packet is output at the output time $T_{OUT}$ using a timer clock.

The scanning system constitutes a system in which the output packets are aligned in a queue and repeatedly scanned at sufficiently small intervals whereby, when a packet is detected as having reached the output time, said packet is output.

The stuff packet insertion system constitutes a system in which the packet length equivalent to the time difference between the maximum delay value and the existing delay value is found and the relevant packets are sent following the sending of the ineffective packets of this length (next stage router abolished).

(d) Packet Batch-shaping Device for Outputting Packet Output Time and So On

Figure 6:
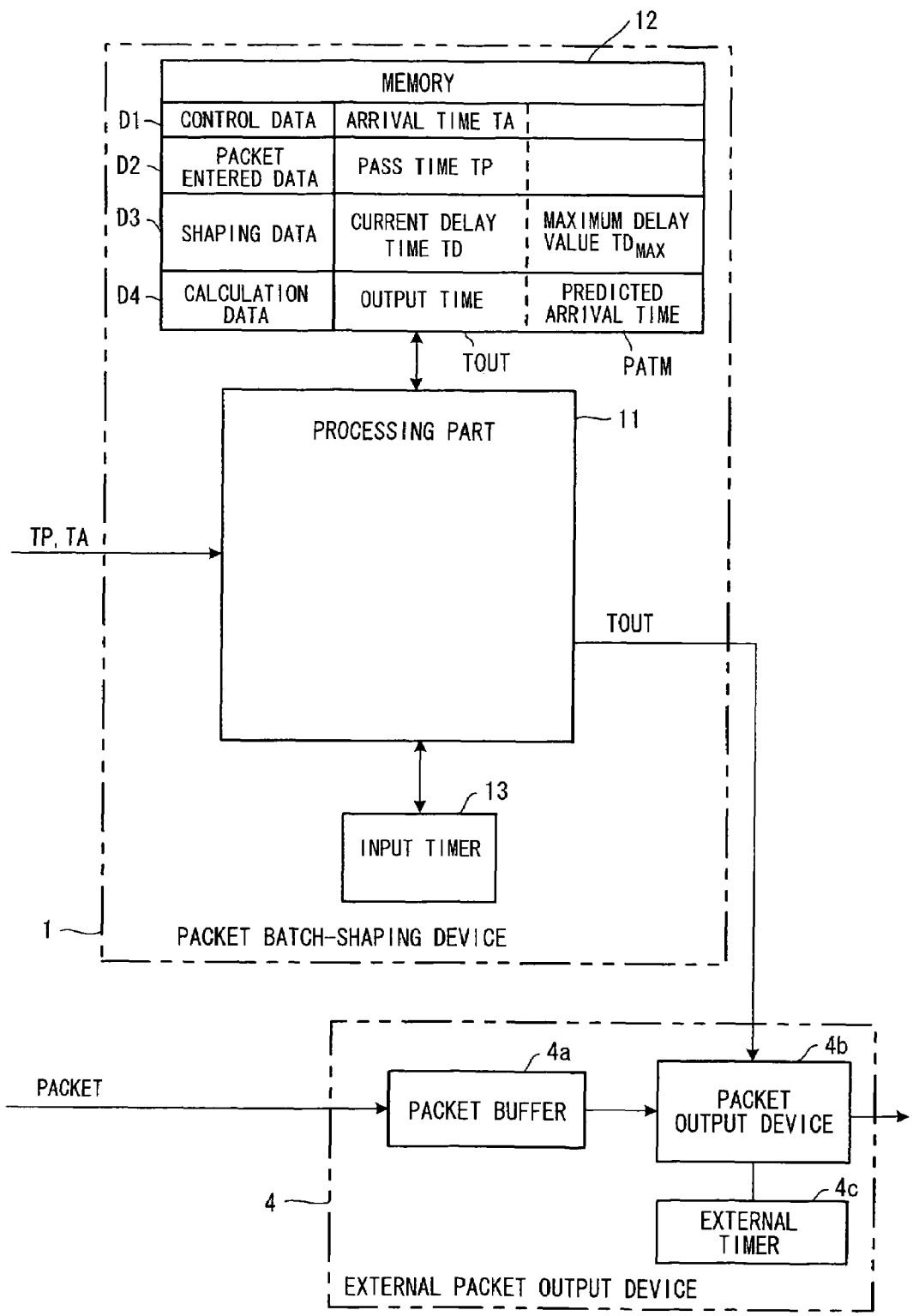
FIG. 6 is a block diagram of a packet batch-shaping device for outputting a packet output time $T_{OUT}$ and packet arrival predicted time PATM.

FIG. 6 is a block diagram of the packet batch-shaping device for outputting packet output time $T_{OUT}$. In this FIG. 6, the identical reference symbols have been assigned to the component sections that are identical to those of FIG. 3. The differences between FIGS. 3 and 6 are the deletion of the packet buffer 14, packet output device 15 and output timer 16 from the packet batch-shaping device 1, the output of the packet output time $T_{OUT}$ to an external part processing part, and the provision of an external packet output device 4. The external packet output device 4 comprises a packet buffer 4a for storing packets, a packet output device 4b, and an output timer 4c for generating an interruption at the output time $T_{OUT}$ and, when the output timer 4c generates the interruption, the packet output device 4b reads out the corresponding packet from the packet buffer and sends this to an output link.

(e) First Modified Example

Figure 7:
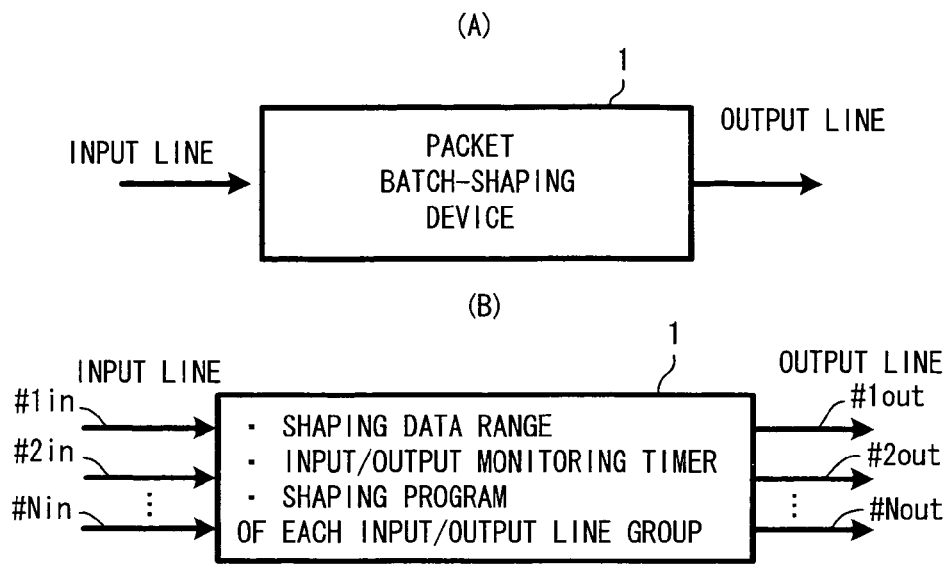
FIG. 7 is an explanatory diagram of a packet batch-shaping device in which the simultaneous packet shaping of a plurality of flows is implemented.

As shown in (A) of FIG. 7, according to the embodiment described above, the packet batch-shaping device includes one input line/one output line and performs shaping one flow. But as shown in (B) of FIG. 7, a configuration in which the packet shaping of a plurality of flows is simultaneously implemented is possible. In configuration of (B) of FIG. 7, a packet batch-shaping device 1 comprise a plurality of sets of input line and output line, a memory 12 and an input/output monitoring timers 13 and 16 for each set, and a program for relating the said shaping flow. In this modification, there are two operational modes outlined below.

In the first operational mode, when a packet to which a pass time PT has been assigned arrives at each of the input lines #1in to #Nin, the packet batch-shaping device 1, in accordance with the shaping process of FIG. 3, shapes each input packet and outputs to corresponding one of the output lines #1out to #N out.

In the second operational mode, when a packet to which a pass time PT has been assigned arrives at each of the input lines #1in to #Nin, the packet batch-shaping device 1, in accordance with the shaping process shown in FIG. 6, shapes each input packet and outputs output time $T_{OUT}$ of each input packet.

(f) Second Modified Example

Figure 8:
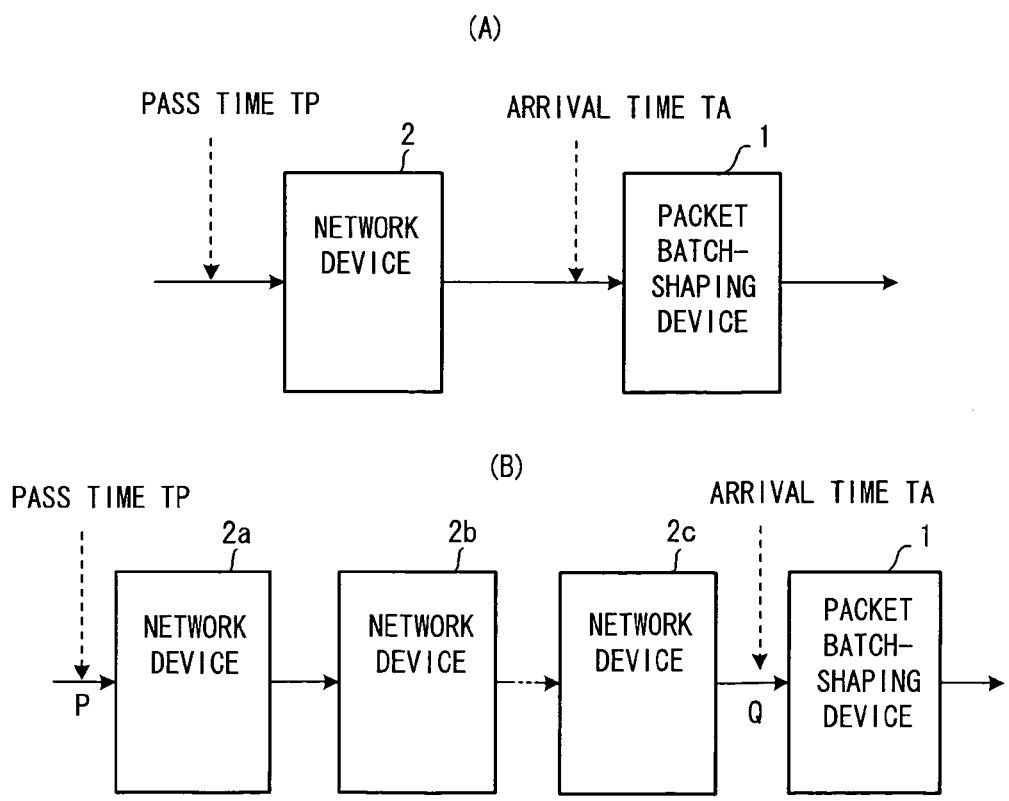
FIG. 8 is an explanatory diagram of the suppressing of burst growth that has been generated in a plurality of communication devices.

As shown in (A) of FIG. 8, according to the embodiment described above the suppression of burst length generated in one network device 2 is performed. But as shown in (B) of FIG. 8, it is possible to suppress the burst length generated in a plurality of sequentially connected network devices 2a to 2c.

According to the first embodiment described above, the burst growth in one flow can be effectively suppressed. In addition, burst growth of a plurality of flows is simultaneously suppressed as a batch and knowledge of the properties of each flow is unnecessary for suppressing the burst growth.

(C) Burst Growth Suppressing Router (a) Router Configuration

Figure 9:
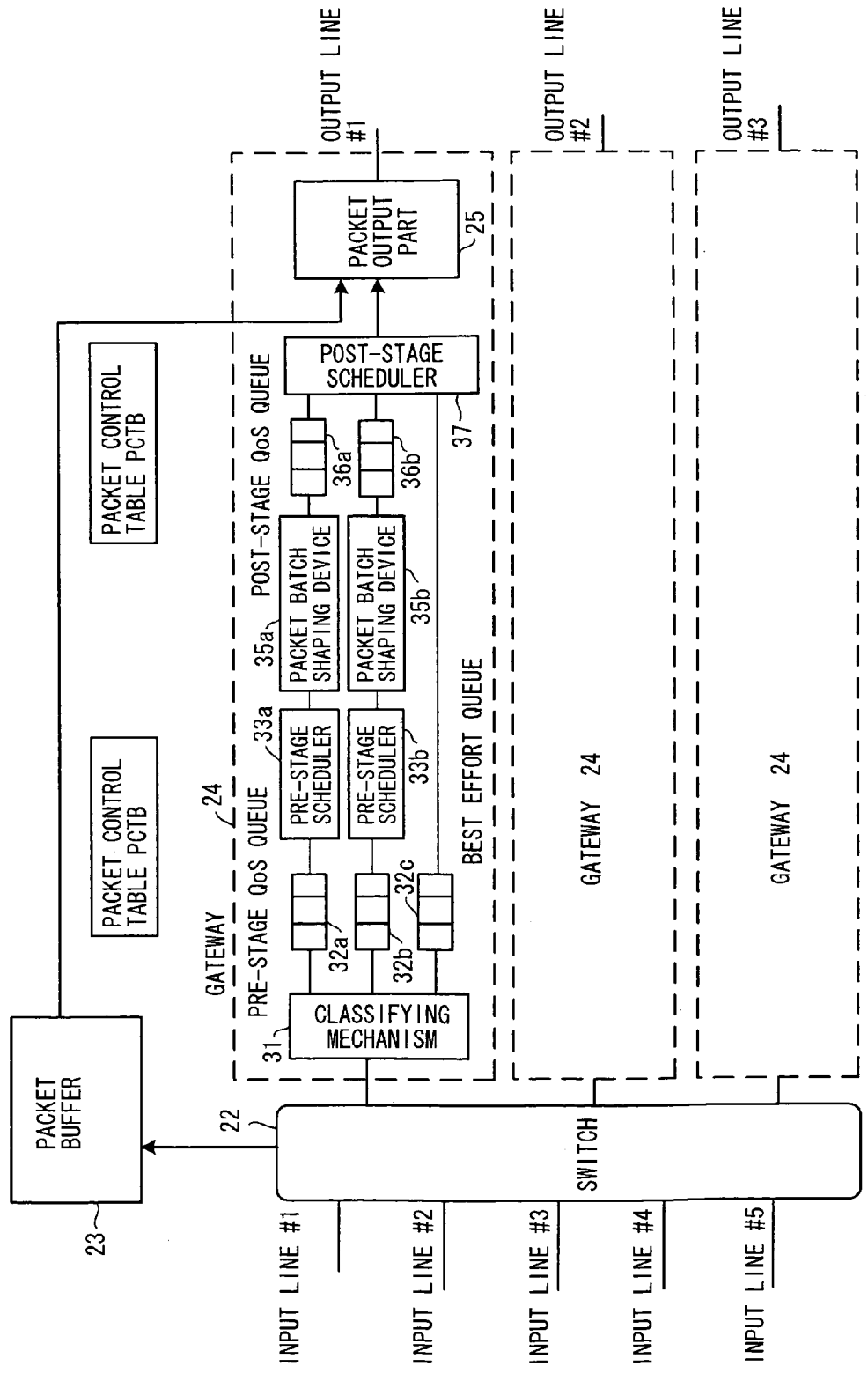
FIG. 9 is a block diagram of a packet batch-shaping device in which packet shaping is performed on flow classes in the order of priority(QoS prioritized)
Figure 10:
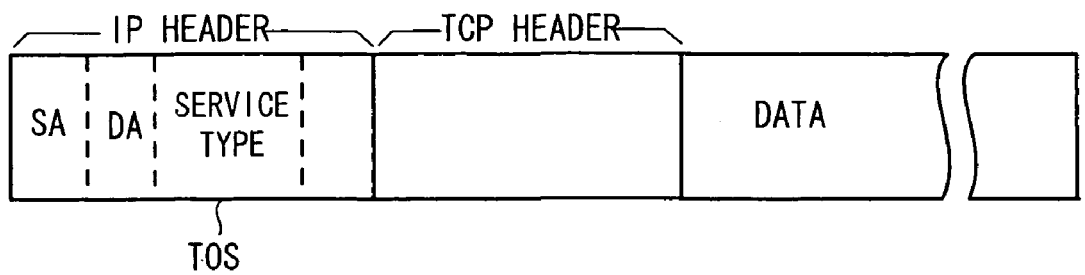
FIG. 10 is an example of a packet format.

FIG. 9 is a block diagram of a router for suppressing the burst length. The router selects a prescribed output link on the basis of the destination address of the IP header on the packets that constitutes the input flow and sends these to a gateway that corresponds to this output link. The gateway, on the basis of the header contents, separates the packets into QoS packets for which communication quality guarantee (QoS) is required and non QoS packets (best effort packets) for which communication quality guarantee is not required, and sends the packets to output links in a sequence that guarantees the communication quality of the abovementioned QoS packets. FIG. 10, which is an example of packet format, is configured from an IP header, a TCP header and user data, and a source address SA, destination address DA, service type TOS data and so on are written in the IP header. Whether the packet is a QoS packet or a non QoS packet is generally recognized on the basis of the priority data of the service type TOS.

Figure 11:
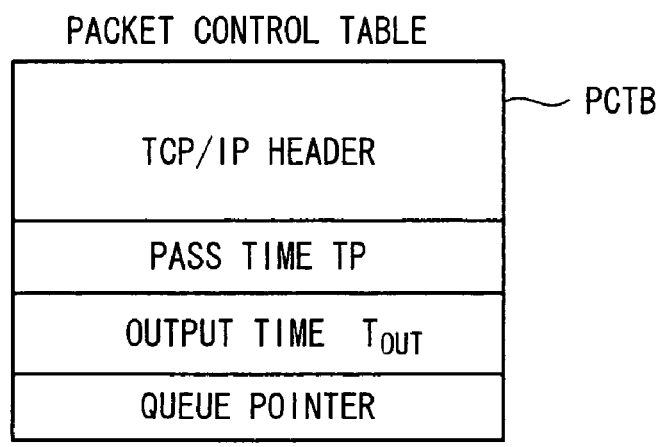
FIG. 11 is an example of a packet control table PCTB.

In the router of FIG. 9, a switch 22 performs a normal router processing to an input packet, determines an output link based on the routing processing, and stores the packets in a packet buffer 23. In addition, the switch 22 produces a packet control table PCTB for each packet and, as shown in FIG. 11, enters the TCP/IP headers in the packet control table and inputs this table to a gateway 24 corresponding to the output link of the packet. The gateways are configured by a classifying mechanism 31, pre-stage QoS queues 32a, 32b, a best effort queue 32c, pre-stage schedulers 33a, 33b, packet batch-shaping devices 35a, 35b, post-state QoS queues 36a, 36b, and a post-stage scheduler 37.

Although the packet buffer 23 can either be shared or provided in each output line or each queue, this embodiment illustrates an example of the shared device mode.

The arriving flows, in accordance with the types of the processing that must be implemented in the gateways, are classified into a plurality of kinds of flows. By way of example, a streaming flow which is expected to suppress the delay to a minimum, a QoS flow which is expected to guarantee the band, and a best effort flow which is not expected QoS guarantee. In addition, the flows may be classified according to the source address. The classes of the above flows are referred to as flow classes.

The description is given in a case where the flow class corresponds to the priority of the flow.

In the gateway 24 provided in correspondence to an output link, the packet classification mechanism 31, referring to the service type TOS of the IP header entered in the packet control table PCTB, classifies the packets as either QoS packets or best effort packets. That is to say, the packet classification mechanism 31 classifies the packets into QoS packets or best effort packets by, if the input packet is an IPv4 packet, referring to the Service Type field of the header, referring to the EXP field for MPLS headers and referring to the Traffic Class field for IPv6 headers and, furthermore, classifies these QoS packets according to priority. A control table PCTB of each QoS packet is stored in the pres-stage QoS queues 32a, 32b according to priority, and the control table PCTB of each best effort packet is stored in the best effort queue 32c. If required to perform a more detailed QoS control, the packet classification mechanism 31 can classify the QoS packets in more detail. The description given below pertains to 2-level priority.

The pre-stage schedulers 33a, 33b arranged in correspondence to the pre-stage QoS queues 32a, 32b establish a packet send sequence for each of the queues and input this into the packet batch-shaping devices 35a, 35b. Each of these packets is shaped and timed by the packet batch-shaping devices 35a, 35b and transferred to the post-stage QoS buffers 36a, 36b.

The burst length of the shaped flow is restored to the burst length that existed when the flow passed through the input monitor, that is to say, to the declared bucket depth.

The pre-stage and post-stage schedulers 33a, 33b, 37 do not stop, as long as packets are present in the QoS buffers.

The packet batch-shaping devices 35a, 35b, which comprise the configuration shown in FIG. 6, employ a packet control table PCTB to determine the output time $T_{OUT}$ of an arrived packet for the purpose of removing the burst growth that is generated between the location at which the pass time is recorded and the location at which the arrival time is recorded, and send packets to the post-stage QoS queues 36a, 36b at the output times $T_{OUT}$ which are calculated on the basis of the output times recorded in the packet control table PCTB. The output time is simultaneously entered in the pass time field of the packets. The post-stage scheduler 37 produces and outputs a single packet string by multiplexing the packet control tables PCTB of the shaping device output queues 36a, 36b and the best effort queue 32c. Control is performed at this time in such a way that the packet control table PCTB in the shaping device output queue 36a are preferentially output and then the packet control table of the queues 36b are output. In addition, the post-stage scheduler 37 preferentially sends the control tables of the QoS packets and sends the control tables of the best effort packets at a timing at which the control tables of the QoS packets are not sent.

The packet output part 25 selects packets from the packet buffer 23 in accordance with the packet control table PCTB output from the schedulers and sends them to output links.

(b) Router Processing

Figure 12:
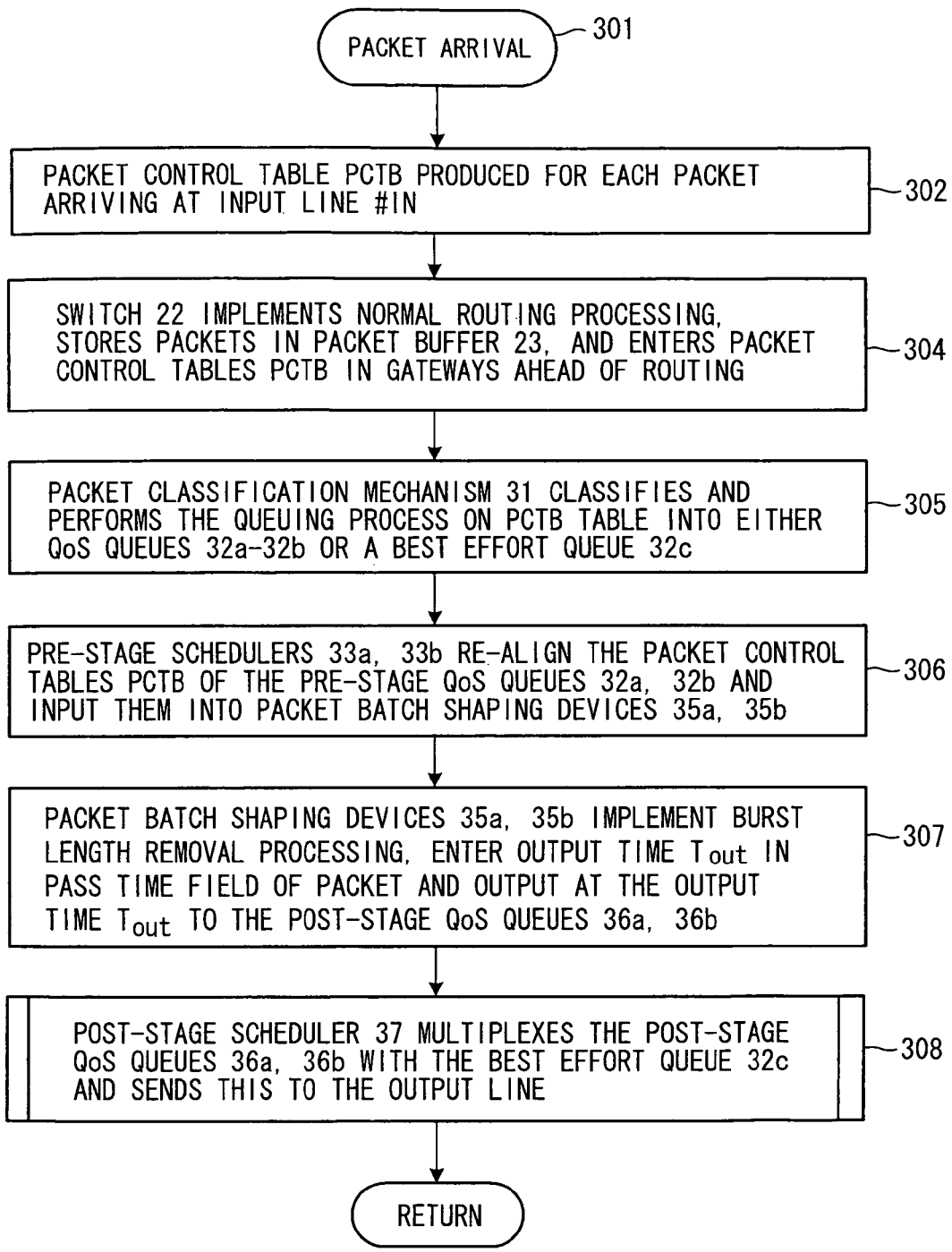
FIG. 12 is a process flow diagram of a router for suppressing burst growth.

FIG. 12 is a process flow diagram of a router for suppressing burst growth. Arrival of packets at the input line #1 in to #N in is monitored (Step 301) and, if packets arrive, the packet control table PCTB shown in FIG. 11 is produced for each packet (Step 302).

The switch 22, referring to the TCP/IP address field of the arrived packets, implements a routing processing to select a gateway 24 in correspondence to an output link, re-writes the layer 2 address and the MPLS label, performs necessary processing such as the alteration of check sum and hop count and stores the packets in the packet buffer 23, and transfers the packet control tables PCTB to the selected gateway 24 (Step 304).

In the gateway 24, firstly, as described above, the packet classification mechanism 31, referring to the Service Type field and so on of the IPv4 header of the packet control table PCTB, implements a queuing process of the control table into either QoS queues 32a-32b or a best effort queue 32c (Step 305).

The pre-stage schedulers 33a, 33b select respectively one of the packet control tables PCTB of the pre-stage QoS queues 32a-32b and input these tables into the correspondent packet batch-shaping device 35a, 35b (Step 306). The packet batch-shaping device 35a, 35b extract the packet control table PCTB, implement burst growth removal processing, enter an output time $T_{OUT}$ into the packet control tables PCTB and the pass time field of the packets, and output the relevant packet control tables at the output time $T_{OUT}$ to the queues 36a, 36b (Step 307).

The post-stage scheduler 37 sends the packet control tables PCTB of the queues 36a, 36b, 32c to the packet output part 25 in order of highest priority.

The packet output part 25 reads out the packets from the packet buffer 23 in correspondence to the control tables PCTB and sends these to the output link (Step 308).

(c) Buffer Size

The size of each buffer required in a burst length suppressing router is calculated as follows. Herein, it is assumed that the delay values of the pre-stage schedulers and post-stage scheduler in the gateway have been obtained. These delay values can be calculated by taking the input flow properties and the scheduler structure into consideration.

(c-1) Buffer Size of Routers on the Path:

(1) For gateway A on a path, pre-hop gateways of flows flowing into a pre-stage scheduler 33a-33b of the gateway A are found and delay value of each flow in the post-stage scheduler 37 is collected. The maximum delay value is referred to as a pivot delay value of the gateways A, and a gateway which gives this maximum value is referred to a pivot gateway of the gateway A.

(2) The buffer amount size per flow in the gateway A is computed in accordance with the following equation:

"gateway buffer amount"=("pivot delay value"+"delay value of the pre-stage scheduler"+"delay value of the post-stage scheduler")דdeclared bucket speed" (1)

(c-2) Buffer Size of the Related Gateways (1) Post-hop gateway for each flow flowing into a gateway A on the path is found. If the gateway A is a pivot gateway for a post-hop gateway, this post-hop gateway is defined as related gateway.

(2) When a new flow added, the gateway buffer amount for a related gateway is recalculated in accordance with above equation (1). The reason why this recalculation is necessary is outlined below. The delay value of a gateway on a path is sometimes changed by addition of a new flow. When the delay value changes the pivot delay value of the related gateways which accepts the output flow of the relevant gateway may also change and, accordingly, the buffer amount of the related gateways as calculated by above equation (1) will also change.

(d) First Modified Example

Figure 13:
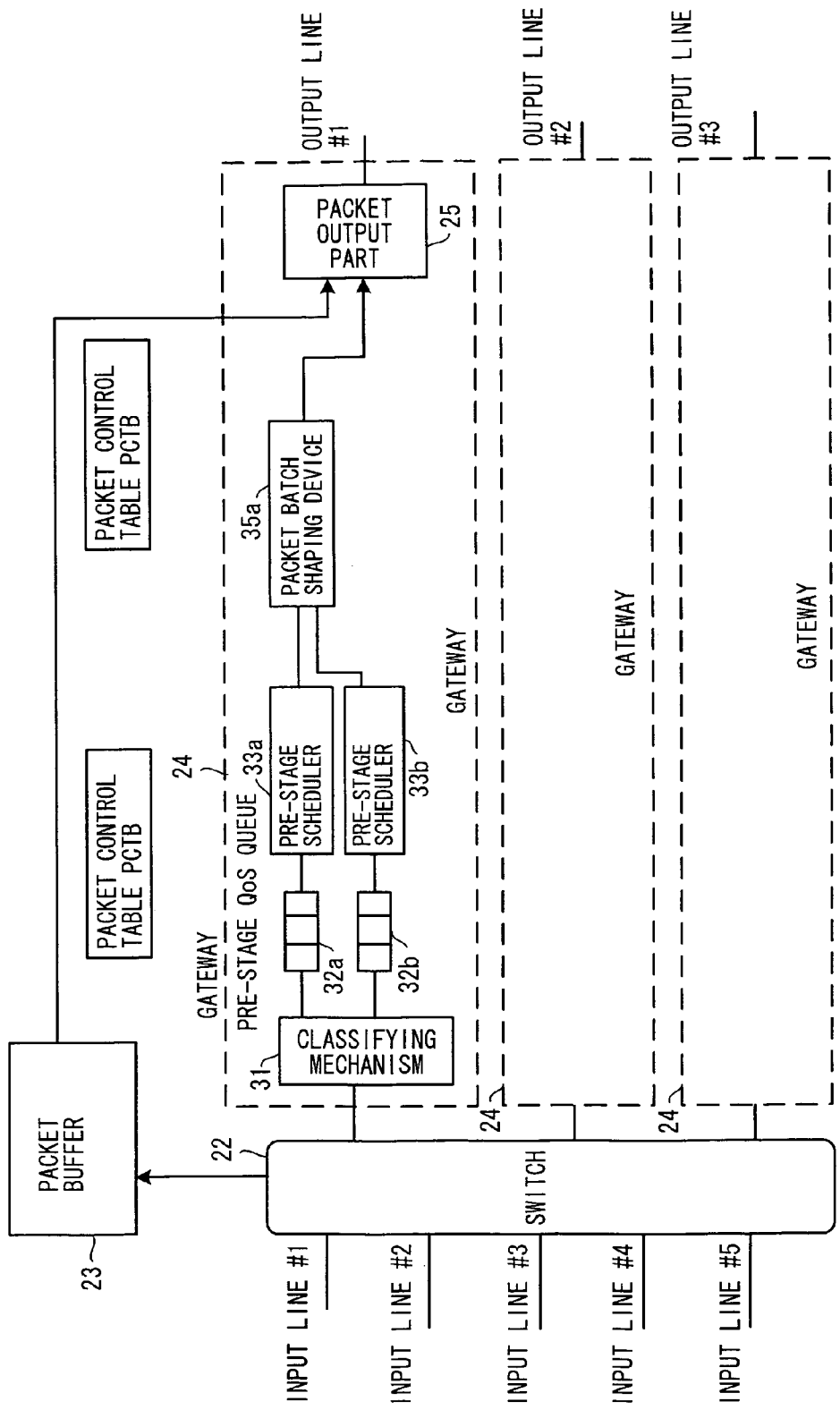
FIG. 13 is a modified example of a packet batch-shaping device.

As shown in FIG. 13, the output burst of a router in which there is no post-stage scheduler provided is always equivalent to the declared bucket depth.

"gateway buffer amount"="declared bucket depth"+ "maximum bucket depth"+"gateway maximum delay value"דdeclared bucket speed".

According to the burst-suppressing router of the second embodiment, the growth of burst length in a router can be prevented without the information as to each flow. In addition, the prevention of burst growth of all flows output to a single output link can be implemented as a batch. In addition, if the router of the present invention is employed, the growth of burst length in the router can be prevented, thereby the burst length of the output flow of the routers can be found from the declared flow properties. This burst length of the output flow of the routers is the burst length of the input flow of the next stage router. As a result, a large-scale network can be easily configured.

(D) Packet Non-loss Network (a) Outline of Third Embodiment

In a packet non-loss network in which there is no packet loss generated the QoS (speed and delay time) of each flow is guaranteed. For this reason, the third embodiment constitutes a network that: (1) calculates and records usable capacities of all links between the routers in a network and buffer usable capacities of the routers; (2) determines a path to a designation address when a communication request has been issued; and (3) accepts this communication request when the buffer usable capacities of all related routers along the path are larger than a requested buffer use amount specified by declared flow properties of the communication request and, when the usable capacities of all links on the path are larger than a requested link use amount specified by the declared flow properties of the communication request. According to this network, the generation of packet discarding in a network due to buffer overflow can be prevented, and the QoS of each flow can be guaranteed without need for the provision of flow data in each router.

The third embodiment is characterized by the method of calculating the buffer usable capacities of the routers and the usable capacities of the links, and by the method of calculating the requested buffer use amount and the requested line use amount.

(b) Packet Non-loss Network

Figure 14:
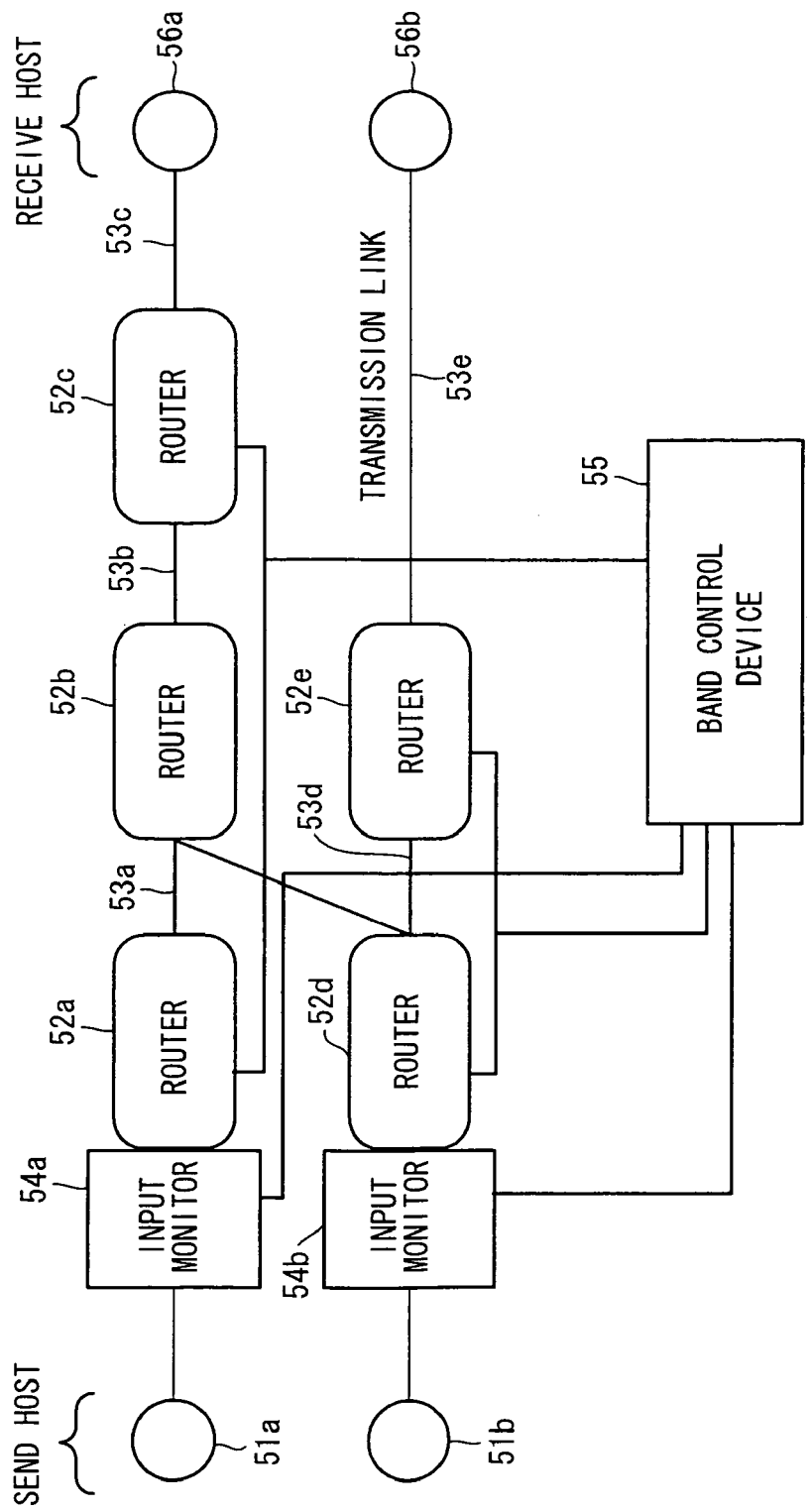
FIG. 14 is a block diagram of the packet non-loss network of the present invention.

FIG. 14 is a block diagram of the packet non-loss network of the present invention configured by, for example, send hosts 51a-51b, routers 52a-52e which constitute network devices, links 53a-53e between the routers, input monitors 54a, 54b provided between the send hosts and routers, a band control device 55 for determining whether or not to accept a communication request, and receive hosts 56a to 56b.

The input monitors 54a to 54b, which are arranged in the inlets of the network, monitor all input flows. At least one band control device 55 per network is provided, and connected to all input monitors 54a to 54b and all routers 52a to 52e. The flows input into the network are consisted of two types, one is a QoS flow and another is a best effort flow. The QoS flow declares the flow properties at the start usage time of the network, and the network guarantees QoS characteristics such as speed greater than the declared speed and packet non-loss. Although a best effort service is always able to be input into the network there is no quality guarantee performed. It should be noted that the QoS flow can be further differentiated into a plurality of levels in accordance with priority.

Figure 15:
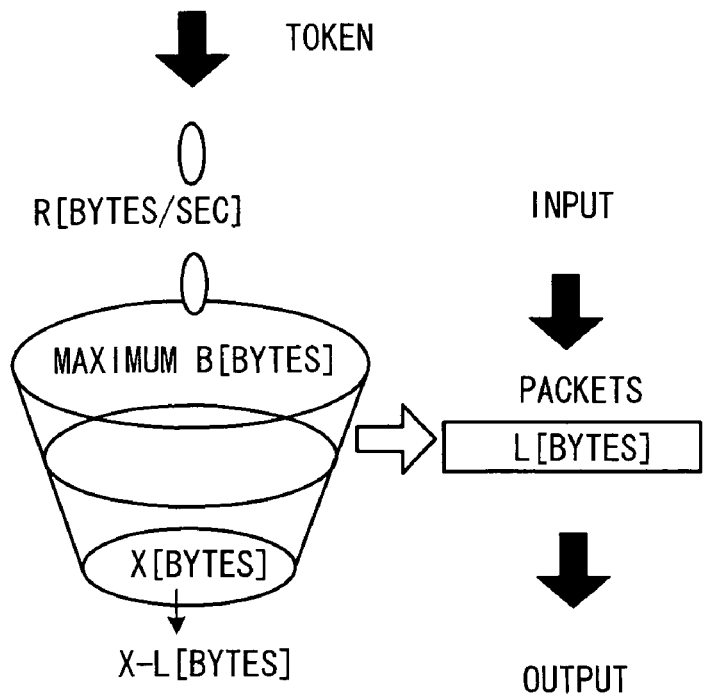
FIG. 15 is an explanatory diagram for describing a leaky bucket.

Flow property declaration is, for example, described using a leaky bucket. FIG. 15 is an explanatory diagram for explaining a leaky bucket that comprises a bucket of b bytes, whereupon tokens accumulate in said bucket at bucket rate r bytes/sec and, when full, overflowing occurs. If a packet of L byte length arrives and a token of L bytes or more is present in the bucket, the packet is allowed to pass and the L byte token is removed from the bucket. If the token of L bytes is not present in the bucket the packet is either discarded or held on standby until a token of L bytes accumulates. In this bucket, the maximum burst length is b bytes (L<b) and the average data speed is r bytes/sec. In the leaky bucket the symbol r refers to the bucket speed and the symbol b refers to the bucket depth (=burst length). Apart from r and b noted above, a peak rate p (bytes/sec), maximum packet length M (bytes) and minimum packet length m (bytes) are prescribed in the description of the leaky bucket.

By the QoS of this packet non-loss network, it is guaranteed that the speed is greater than the declared speed and the bucket packet loss is zero. In addition, an end-to-end maximum delay value is calculated using the declared flow properties and the network configuration.

The gist of the operation of the packet non-loss network as described below is the same as that of a normal packet network. First, the function of the send hosts 51a, 51b, the receive hosts 56a, 56b and the transfer links 53a-53d is the same as that in a normal packet network. In addition, the routers 52a-52e are normal routers or burst-suppressing routers. The probability that rejects a communication request is decreased when the burst-suppressing router is employed. If an over-designed network is used, a packet non-loss network can be configured without knowledge of the inner structure of the routers.

Figure 16:
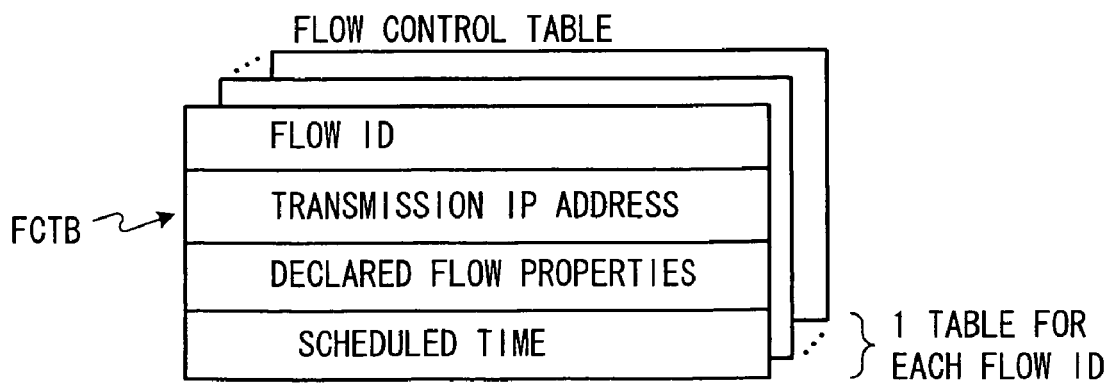
FIG. 16 is an example of a flow control table FCTB.

In FIG. 14, when a communication request of a new flow is received, the input monitors 54a-54b produce a flow control table FCTB as shown in FIG. 16 and, by attaching the flow control table, inquire to the band control device 55 whether or not communication acceptance is possible. Flow ID, source and destination IP addresses and declared flow properties and so on are recorded in the flow control table FCTB. In addition, if the speed of the input QoS flow during communication is greater than the declared flow properties, the input monitors 54a-54b perform flow shaping by discarding packets and delaying packets so that the speed of the input flow becomes equal to that of the declared flow. Further, the input monitors 54a-54b calculate the next packet receive scheduled time, record this in the flow control table FCTB, detect communication completion (where the packet receive scheduled time has elapsed and the next packet has not arrived), and notify the band control device 55 of the communication completion.

Figure 17:
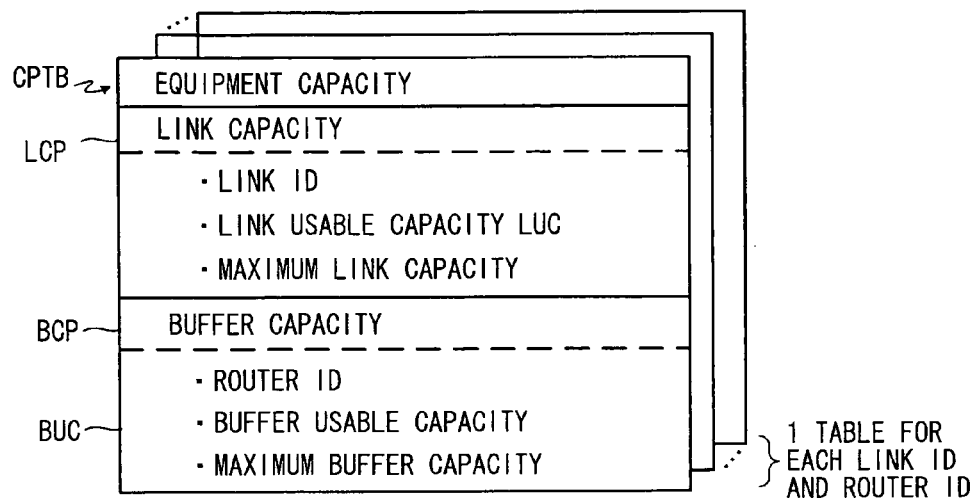
FIG. 17 is an example of a table CPTB for showing the equipment capacities of all routers in a network.

The band control device 55, as shown in FIG. 17, comprises a table CPTB for controlling the equipment capacity of each of the links and routers that constitutes the network. The link equipment capacity LCP and router equipment capacity BCP are contained as items in the table. The link equipment capacity LCP includes 9 link ID of the links, the link usable capacity LUC and the link maximum capacity, and the buffer capacity BCP includes a router ID, buffer usable capacity BUC and maximum buffer capacity.

Figure 18:
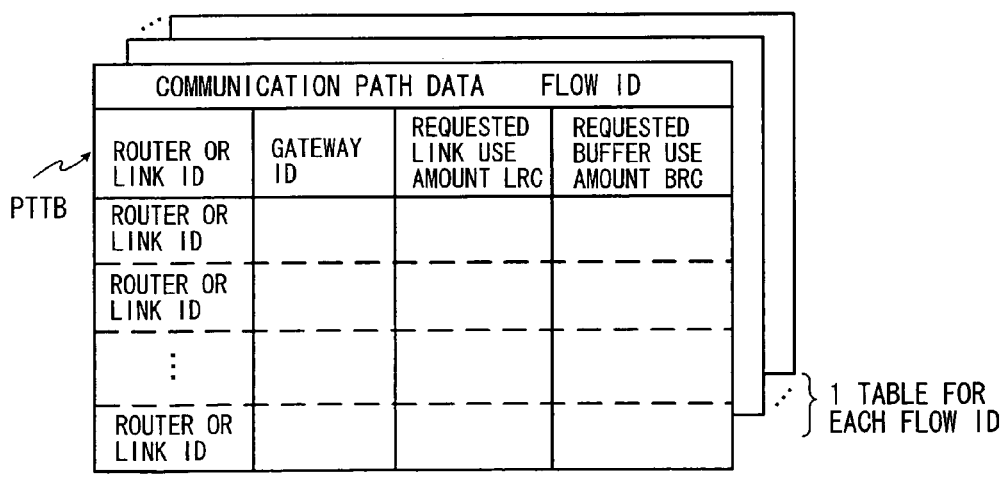
FIG. 18 is an example of a communication path table PTTB.

In addition, as is shown in FIG. 18, the band control device 55 comprises a table PTTB in which is written, for each flow communication path, the ID of all equipments (routers, links) which constitutes the path, a gateway ID, and requested use amount of to the equipments (for links, the requested link use amount LRC and for routers the request buffer capacity BRC).

The band control device 55, as shown in FIG. 19A, comprises a gateway flow data table GFTB in which is written, for each router gateway, IDs of the flows that pass through the gateways.

In addition, the band control device 55, as shown in FIG. 19B, comprises a gateway delay data table GDTB in which is written, for each gateway, maximum delay value of the pre-stage scheduler and the post-stage scheduler, pivot delay value and burst growth (normal router only).

At the communication start of a QoS flow the band control device 55 implements a packet admission control based on requests from the input monitors 54a-54b. That is to say, using the transmission IP address contained in the flow control table FCTB of the input flows, the band control device 55 executes routing processing to determine the communication path and the equipment on the path. The band control device 55 also calculates the requested use amount of the equipment (for links, the requested link use amount LRC and for routers the request buffer capacity BRC) using performance and declared flow properties of the equipment (links and router buffers). The band control device 55 further recalculates the requested buffer use amount of the related gateways. Next, for each equipment of the path and related gateways, it compares the usable capacities LUC and BUC with the calculated requested buffer use amount and requested link use amount respectively. Only if the requested buffer use amount and requested link use amount are fulfilled by all equipment, it determines to accept the communication request and notifies the input monitors 54a-54b of the result of the judgment thereof. If acceptance of the communication request occurs the calculated values are entered in a correspondent table. The characterizing feature of the third embodiment lies in a method of judging whether a communication request is admitted or not.

When flow communication is completed the requested link use amount LRC and requested buffer use amount BRC of the equipments on the path written in the table PTTB are added to the link usable capacity LUC and buffer usable capacity BUC. The requested buffer use amount BRC of equipments related to the flow is recalculated and the difference between BRC s before and after recalculation is added to the buffer usable capacity BUC.

In addition, when notification of communication start and completion is received from the input monitors 54a-54b and when the network equipment is altered, the band control device 55 renews and maintains the usable capacities LUC, BUC.

(c) Communication Request Processing by the Input Monitors

Figure 20:
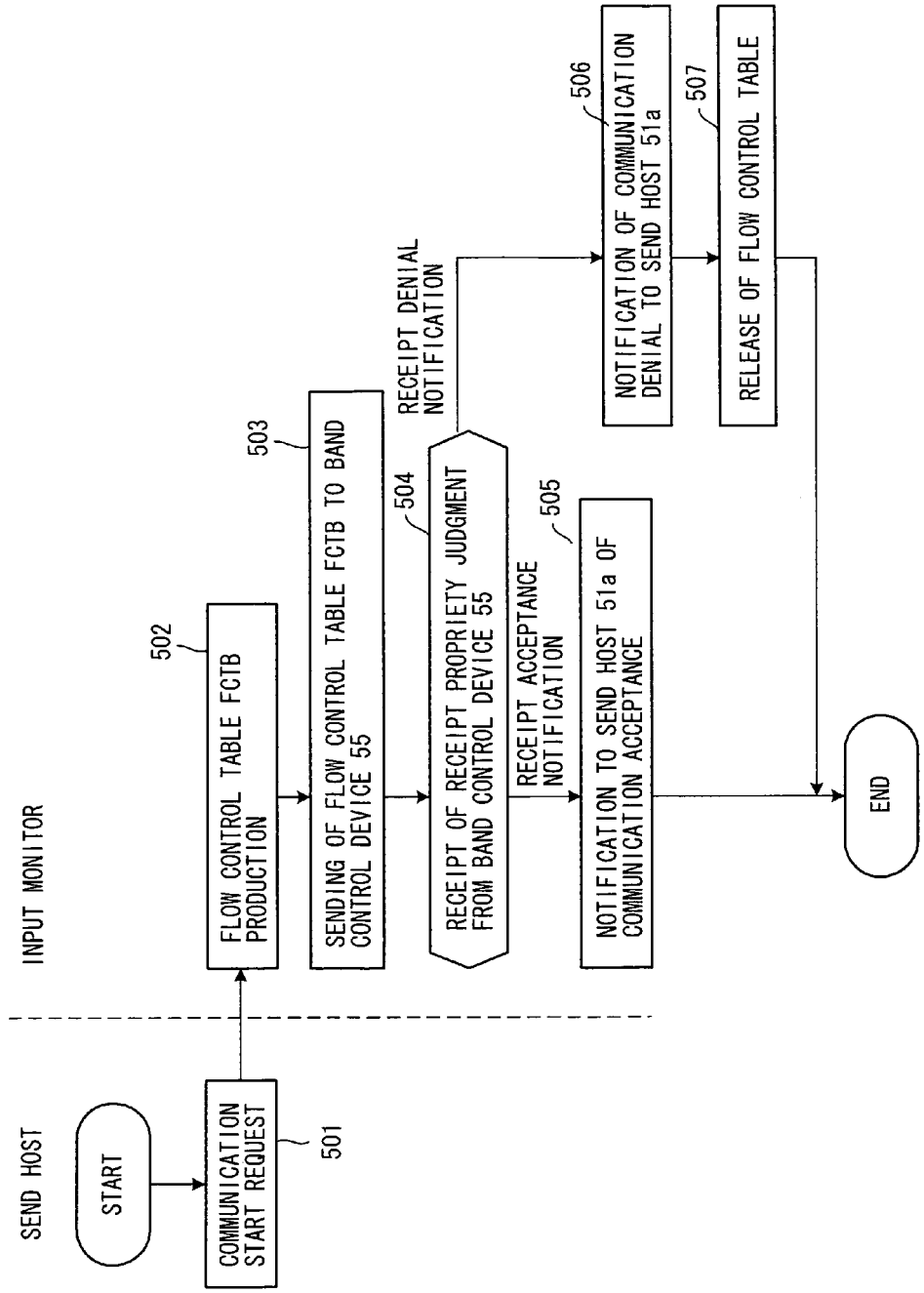
FIG. 20 is a communication start request process flow diagram of an input monitor in a case where a communication request has been issued by a send host.

FIG. 20 is a communication start request process flow of an input monitor in a case where a communication request has been issued from a send host.

When a communication request is generated by a send host 51a (Step 501), the input monitor 54a creates a flow control table FCTB shown in FIG. 16. That is to say, it produces a flow ID for each flow and, together with the source and destination addresses and the declare flow properties attached to the communication start request, enters this flow ID in the flow control table FCTB (Step 502). Next, the input monitor 54a sends the flow control table FCTB to the band control device 55 and inquires as to the propriety of the acceptance of the communication request (Step 503).

If an answer is received from the band control device 55 a check is carried out to whether it is to be accepted or denied (Step 504), and the send host is notified of the result of this check. That is to say, if accepted, the send host 51a is notified of communication approval (Step 505) and, if communication is denied, the send host 51a is notified of communication denial (Step 506) and the flow control table FCTB is released (Step 507).

(d) Input Monitor Communication Processing

Figure 21:
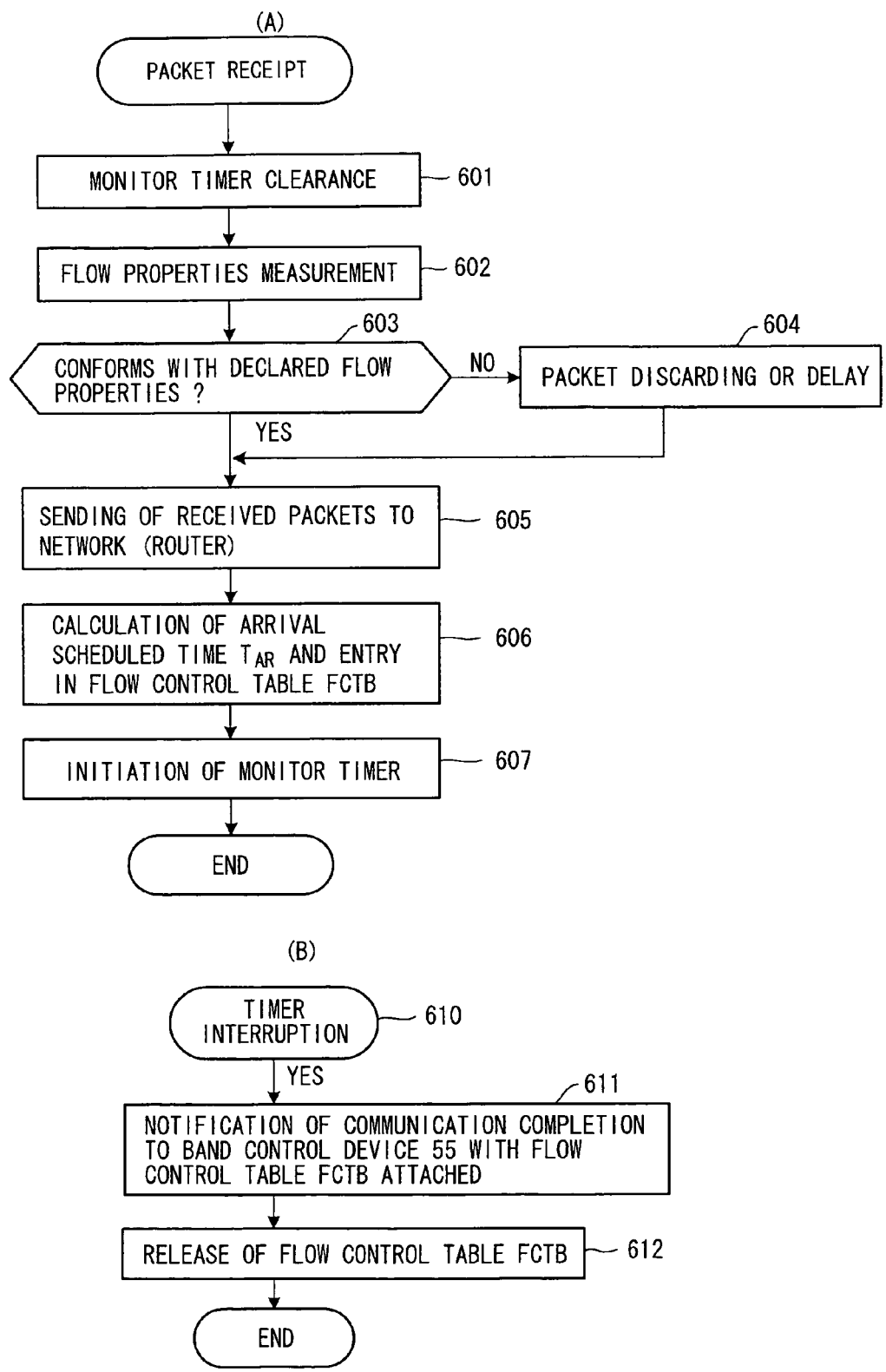
FIG. 21 is a process flow diagram of an input monitor in communication.

FIG. 21 show a process flow diagram of during communication in an input monitor.

If a packet is received from the send host 51a after notification of communication approval, the input monitor 54a clears the monitoring timer (not shown in the diagram) (Step 601). Next, the input monitor 54a measures the properties of the packet flow (Step 602) and monitors whether or not the packet flow satisfies the declared flow properties entered in the flow control table FCTB (Step 603). Then, the input monitor 54a performs control so that violation packets are discarded or delayed, thereby the packet flow satisfies the declared properties (Step 604).

Thereafter, it sends the received packet to the network (router) (Step 605), calculates and enters the next packet arrival scheduled time $T_{AR}$ of the next packet in the flow control table FCTB (Step 606) and, in addition, sets the packet arrival scheduled time $T_{AR}$ in the monitoring timer (Step 607). The packet arrival scheduled time $T_{AR}$ is calculated by, for example, dividing the bucket depth b by the bucket speed r and multiplying by the safety coefficient.

The monitoring timer is cleared in Step 601 each time a packet arrives and, in Step 607, the packet arrival scheduled time $T_{AR}$ of the next packet is set. When the packet arrival scheduled time elapses without arrival of the packet, the monitoring timer generates a timer interruption (Step 610). The input monitor 54a, based on the timer interruption, judges that the input flow has been completed (communication completion) and notifies the band control device 55 of communication completion with the flow control table FCTB attached (Step 611) and releases the flow control table (Step 612).

(e) Process for Service Start of the Band Control Device

Figure 22:
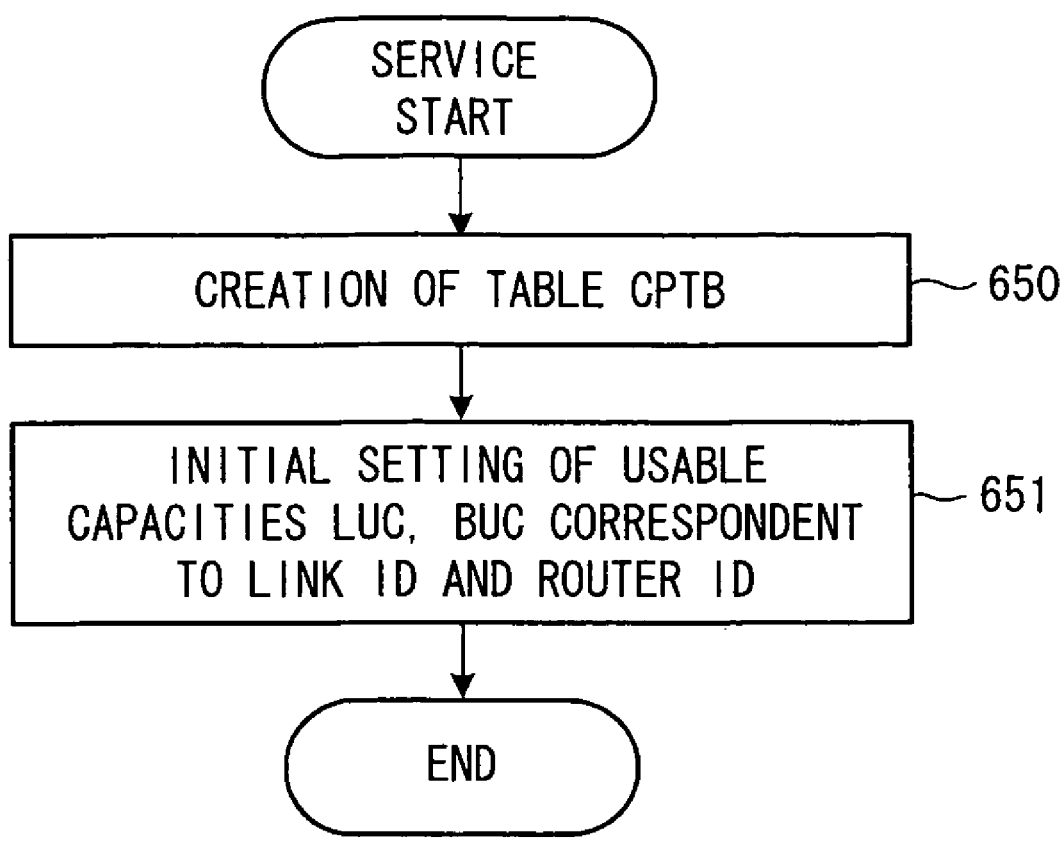
FIG. 22 is a service start process flow diagram of a band control device.

FIG. 22 is a process flow diagram of the service start of the band control device. At the start of service the band control device 55 creates the equipment capacity table CPTB (Step 650), sets initially the link maximum use capacity in the table CPTB as the link usable capacity LUC in correspondence to the link ID of the links. It also sets initially buffer usable capacity BUC in the table CPTB as the buffer usable capacity BUC in correspondence to the router ID of the routers (Step 651).

(f) Acceptance Control

Figure 23:
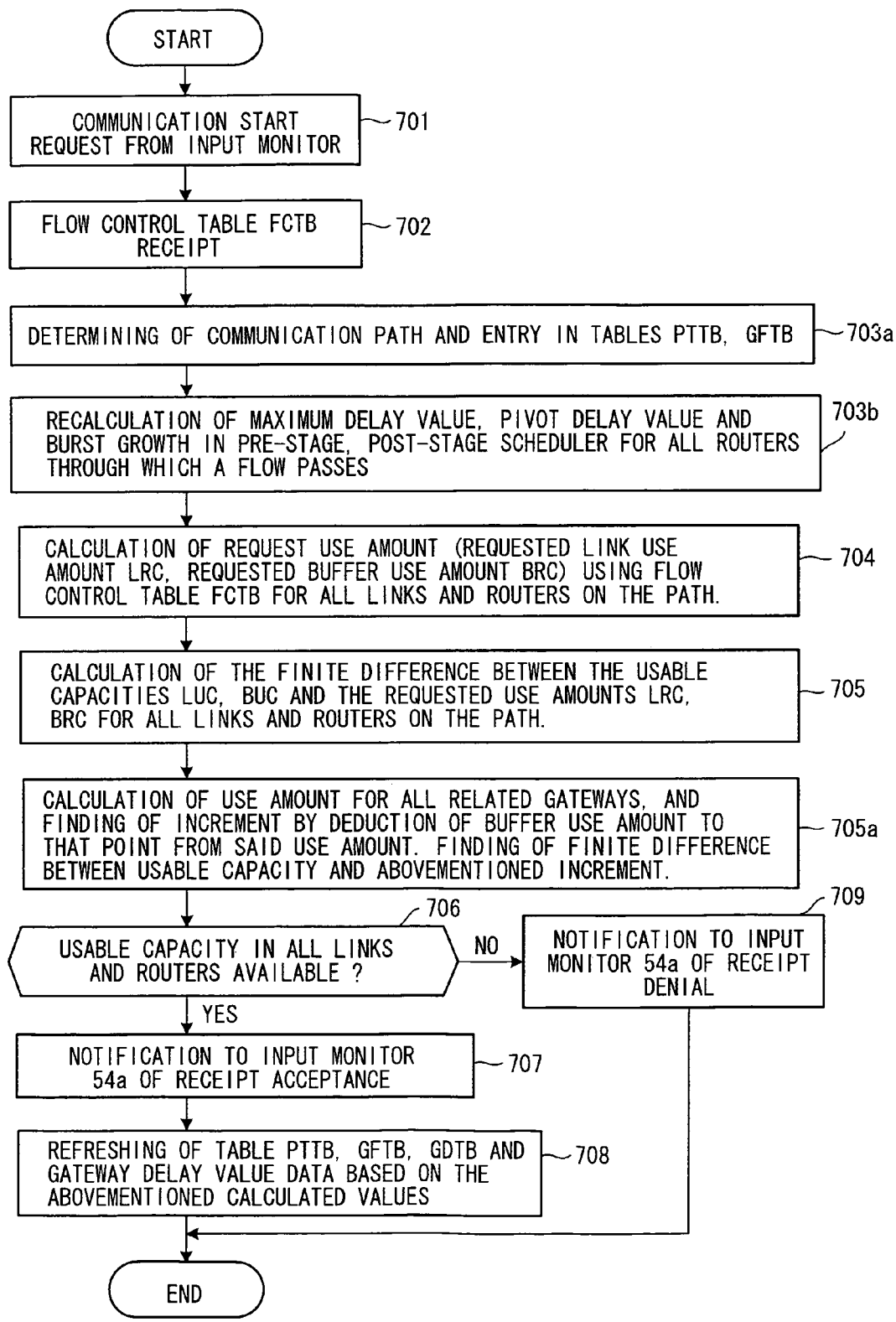
FIG. 23 is an acceptance control process flow diagram of the band control device.

FIG. 23 is an acceptance control process flow by the band control device.

As soon as the band control device 55 receives a communication start request accompanied with the flow control table FCTB from the input monitor 54a (Steps 701-702), it determines the communication path of the relevant flows using the source and destination addresses contained in the flow control table FCTB. Then, the band control device 55 enters the IDs of transfer links and routers on the path in the table PTTB, and enters IDs of the gateways on the path in the table GFTB (Step 703a). In addition, the band control device 55 recalculates the pre- and post-stage delay values, pivot delay value and burst length in the table GDTB for all gateways through which the relevant flow passes and rewrites them in the table GFTB (Step 703b).

Next, using the declared properties, the band control device 55 calculates the requested link use amount LRC of the links and requested buffer use amount BRC of the routers on the path (Step 704).

The calculation of the requested link use amount LRC and requested buffer Use amount BRC is based on the following.

In a case of normal router (not a burst growth suppressing-type router):

The declared packet speed of the flow is regarded as the requested link use amount LRC. And the burst length listed in the table GDTB is regarded as the requested buffer use amount BRC.

The burst length is calculated as follows.

The burst length of a first hop router on a communication path is a value obtained by adding the maximum packet length to the declared bucket depth. The burst length of the second hop router and beyond is obtained from the following equation:

"burst length"="pre-hop router burst length"+"pre-hope gateway delay value"דflow speed".

The gateway delay value is described in, for example, the literature (author: Iwao Toda, Detailed Explanation of QoS Techniques, Ohm Co., 2001, pp. 214-231). The gateway delay value can be calculated if the declared properties of the flow and the scheduler type used by the gateway are known.

In a case a burst growth suppressing-type router in which a packet batch-shaping device is used:

When a new communication request is received the band control device 55 adds the flow ID to the table GFTB and recalculates the pre-stage scheduler delay value, post-stage scheduler delay value and pivot delay value of the GDTB for all gateways on the path along which the relevant flow passes (Step 703b). If the scheduler structure used by the gateways and the declared flow properties of all flows that flow along the relevant gateways are known, the delay values can be calculated in accordance with a method described in the above literature. In practice it is possible to use the maximum delay value in the network as the delay values.

The requested link use amount LPC is obtained by the equation:

LRC=bucket speed.

The requested buffer use amount BRC for each gateway on the path is calculated by the equation:

BRC=("declared bucket depth"+"maximum packet length")+("relevant gateway pivot delay value"+ "relevant gateway pre-stage scheduler maximum delay value")×"declared bucket speed".

For related gateways, the band control device 55 regards the value calculated by the above equation as a new requested buffer use amount, and obtains the increment by deducting the current requested use amount from this value. Then, it produces the difference D between this increment and the buffer usable capacity. The difference D is after used in step 705*a*.

By virtue of the fact that, in the first modified example, there is no burst growth generated as a result of the non-provision of the post-stage scheduler, it calculates the required buffer use amount BRC by the equation:

BRC="declared bucket depth"+"maximum packet length"+("relevant gateway pre-stage scheduler maximum delay value")×"declared bucket speed".

Related gateways do not exist.

Over-designed Network

The maximum delay value of gateways in an IP network for the transfer of packets depends on the type of scheduler used by the gateways and the input traffic characteristics.

In a case where, the scheduler structure in the existing network is unclear or alteration thereto is impossible, an over-designed network is configured in which the output link speed of the gateways is considered as a speed more than a (>1) times the input flow speed (see (B) of FIG. 24). In the over-designed network configuration of this kind, the pre-stage and post-stage scheduler maximum delay values of a gateway are not dependent on the type of scheduler used and they are smaller than a value obtained by dividing a sum by (a−1). The sum is computed by adding a bucket depth and maximum packet length for each input flow and summing all the results of the addition. It should be noted that (A) of FIG. 24 illustrates an original network configuration.

When the packet non-loss network of a first modified example is configured using the principle of the over-designed network, the requested buffer use amount BRC is equivalent to a/(a−1) times the value obtained by adding the maximum packet length to the bucket length of the relevant flow.

After calculation of step 704 in FIG. 23, the band control device 55 computes a difference between the requested link use amount LRC and the link usable capacities LUC of the links. It also computes a difference between the requested buffer use amount BRC and the buffer usable capacities BUC of the routers on the path (Step 705) and computes differences D for the related gateways (Step 705*a*). Then, the band control device 55 performs a check to determine whether or not all the differences of the links, routers and related gateways are positive (Step 706). If all are positive, it notifies the input monitor 54*a* of receipt approval (Step 707). Thereafter, the band control device 55 entries the data about the flows to the table FCTB and regards respectively the above differences as the link usable capacities LUC of the links and the buffer usable capacities of the routers BUC. And then it refreshes the contents of the table CPTB by these differences. In addition, the band control device 55 stores the above requested use amount in the table PTTB of FIG. 18 in correspondence to the link ID or router. Further, it adds the flow ID to the GFTB and refreshes the gateway delay data (Step 708).

Meanwhile, in Step 706, if any difference is negative, the band control device 55 notifies the input monitor of receipt denial and clears the path data of FIG. 19 (Step 709).

(g) Process for Communication Completion of the Band Control Device

Figure 25:
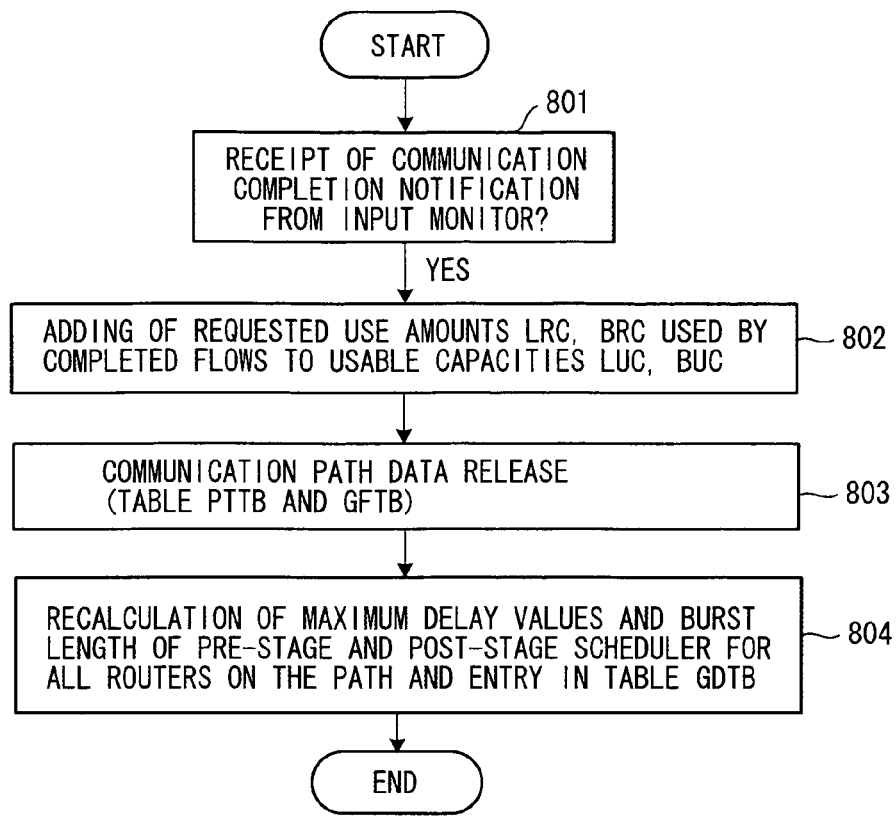
FIG. 25 is a communication completion process flow diagram of a band control device.

FIG. 25 is a process flow diagram of communication completion in a band control device.

If a communication completion notification is received from the input monitor 54*a* (Step 801), the band control device 55 finds from the table CPTB (FIG. 17) the usable capacities LUC, BUC of the links and routers. These links and routers constitute the path of the completed flows. The band control device 55 also finds from the table PTTB (FIG. 18) the requested link use amount LRC and requested buffer use amount BRC.

Then, it adds the requested link use amount LRC and requested buffer use amount BRC to the usable capacities LUC, BUC respectively, and refreshes the usable capacities LUC, BUC and writes these in the table CPTB. In addition, it recalculates the requested buffer use amount of the routers related to the flows, and adds the difference D between the current use amount and the recalculated amount to the buffer usable capacity BUC and enters this in the table CPTB (Step 802). Thereafter, it deletes the path data pertaining to the communication completed flows from the tables PTTB, GFTB (Step 803) as well as it deletes the relevant flow ID from the table GFTB. In addition, it recalculates the pre-stage and post-stage scheduler maximum delay value, pivot delay value and burst growth for all routers along which the relevant flows have passed and, to complete the process, enters these in the table GDTB (Step 804).

(h) Equipment Alteration

Figure 26:
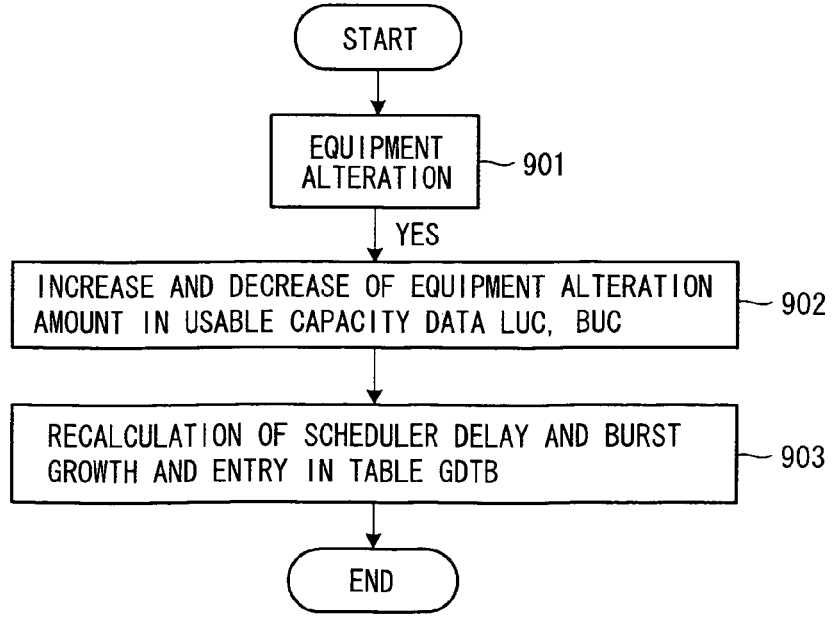
FIG. 26 is an equipment alteration process flow diagram of a band control device.

FIG. 26 is a process flow diagram of equipment alteration to the band control device. When equipment is altered (addition or removal or damage to equipment) (Step 901), to conform to the equipment alteration, the link usable capacity LUC and buffer usable capacity BUC that are increased or decreased to ensure they agree to the current condition (Step 902). To conform to the equipment alteration, the values entered in the table GDTB are recalculated and stored (Step 903).

Based on the third embodiment, there is no need for recording the data about each flow in the routers in the packet non-loss network and the QoS is guaranteed, thereby (1) packet loss does not generate in the network due to buffer overflow;

(2) communication is guaranteed in the range that does not exceed the declared flow properties; and (3) the upper limit of delay is computed when packets of flows pass through the network.

As many apparent widely different embodiments of the present invention can be made without departing from the sprit and scope thereto, it is to be understood that the invention is not limited to the specific embodiments thereof except as defined in the appended claims.

What is claimed is:

1. A packet shaping device for performing shaping to an original burst length when burst of flow consisted of packet strings has grown in a communication device, comprising:
   arrival time monitoring means for monitoring an arrival time for each packet on which pass time has been recorded at a location of recording of said pass time;
   pass time obtaining means for obtaining said pass time from the packet at a location of monitoring of the arrival time;
   delay time calculation means for calculating delay times of arrived packets from the location of recording of said pass time to the location of monitoring of said arrival time, based on said pass time along with said arrival time;

maximum delay time obtaining means for obtaining, for each flow, a maximum delay time among the delay times of the packets that have arrived;

send time determining means for, based on the maximum delay time, determining send time of the arrived packets; and packet sending means for sending said arrived packets at said send time, thereby performing packet shaping.

2. The packet shaping device according to claim 1, wherein said packet sending means includes:

packet storing means for storing the arrived packets;

send time data output means for outputting said send time of the arrived packets; and a packet output device for reading the arrived packets out of the packet storing means at said send time and outputting said arrived packets, thereby performing packet shaping.

3. The packet shaping device according to claim 1, wherein said communication device comprises one or more groups of input lines and output lines, and said packet shaping device is provided in each output line.

4. The packet shaping device according to claim 1, comprising means for clearing said maximum delay time if a packet does not arrive in a prescribed time.

* * * * *